Nov. 10, 1942. R. H. HERRICK Re. 22,220

TELEPHONE SYSTEM Orig. 2,187,902

Original Filed May 12, 1938 8 Sheets-Sheet 1

| | | |
|---|---|---|
| | FIG.3 | FIG.4 |
| FIG.2 | FIG.5 | |
| FIG.1 | FIG.6, FIG.6a, OR FIG.6b. | |

INVENTOR.
ROSWELL H. HERRICK
BY Davis, Lindsey, Smith & Shonts
ATTORNEYS.

TELEPHONE SYSTEM

Original Filed May 12, 1938 8 Sheets-Sheet 2

INVENTOR.
ROSWELL H. HERRICK

BY Davis, Lindsey, Smith & Shonts

ATTORNEYS.

27

Nov. 10, 1942. R. H. HERRICK Re. 22,220

TELEPHONE SYSTEM

Original Filed May 12, 1938 8 Sheets-Sheet 3

INVENTOR.
ROSWELL H. HERRICK
BY Davis, Lindsey, Smith & Shonts
ATTORNEYS.

Nov. 10, 1942. R. H. HERRICK Re. 22,220

TELEPHONE SYSTEM

Original Filed May 12, 1938 8 Sheets-Sheet 4

INVENTOR.
ROSWELL H. HERRICK
BY Davis, Lindsey, Smith & Shonts
ATTORNEYS.

Nov. 10, 1942. R. H. HERRICK Re. 22,220

TELEPHONE SYSTEM

Original Filed May 12, 1938 8 Sheets-Sheet 5

INVENTOR.
ROSWELL H. HERRICK
BY Davis, Lindsey, Smith & Shonts
ATTORNEYS.

Nov. 10, 1942. R. H. HERRICK Re. 22,220

TELEPHONE SYSTEM

Original Filed May 12, 1938 8 Sheets-Sheet 6

INVENTOR.
ROSWELL H. HERRICK
BY Davis, Lindsey, Smith & Shonts
ATTORNEYS.

Nov. 10, 1942. R. H. HERRICK Re. 22,220

TELEPHONE SYSTEM

Original Filed May 12, 1938 8 Sheets-Sheet 7

INVENTOR.
ROSWELL H. HERRICK
BY Davis, Lindsey, Smith & Shonts
ATTORNEYS.

TELEPHONE SYSTEM

Original Filed May 12, 1938 8 Sheets-Sheet 8

INVENTOR.
ROSWELL H. HERRICK
BY Davis, Lindsey, Smith & Shonts
ATTORNEYS.

2 7

Search Room

Reissued Nov. 10, 1942

Re. 22,220

UNITED STATES PATENT OFFICE 22,220

TELEPHONE SYSTEM

Roswell Harry Herrick, Oak Park, Ill., assignor to Associated Electric Laboratories, Inc., Chicago, Ill., a corporation of Delaware Original No. 2,187,902, dated January 23, 1940, Serial No. 207,433, May 12, 1938. Application for reissue August 19, 1940, Serial No. 353,316

44 Claims. (Cl. 179—27)

Figures 1, 7:
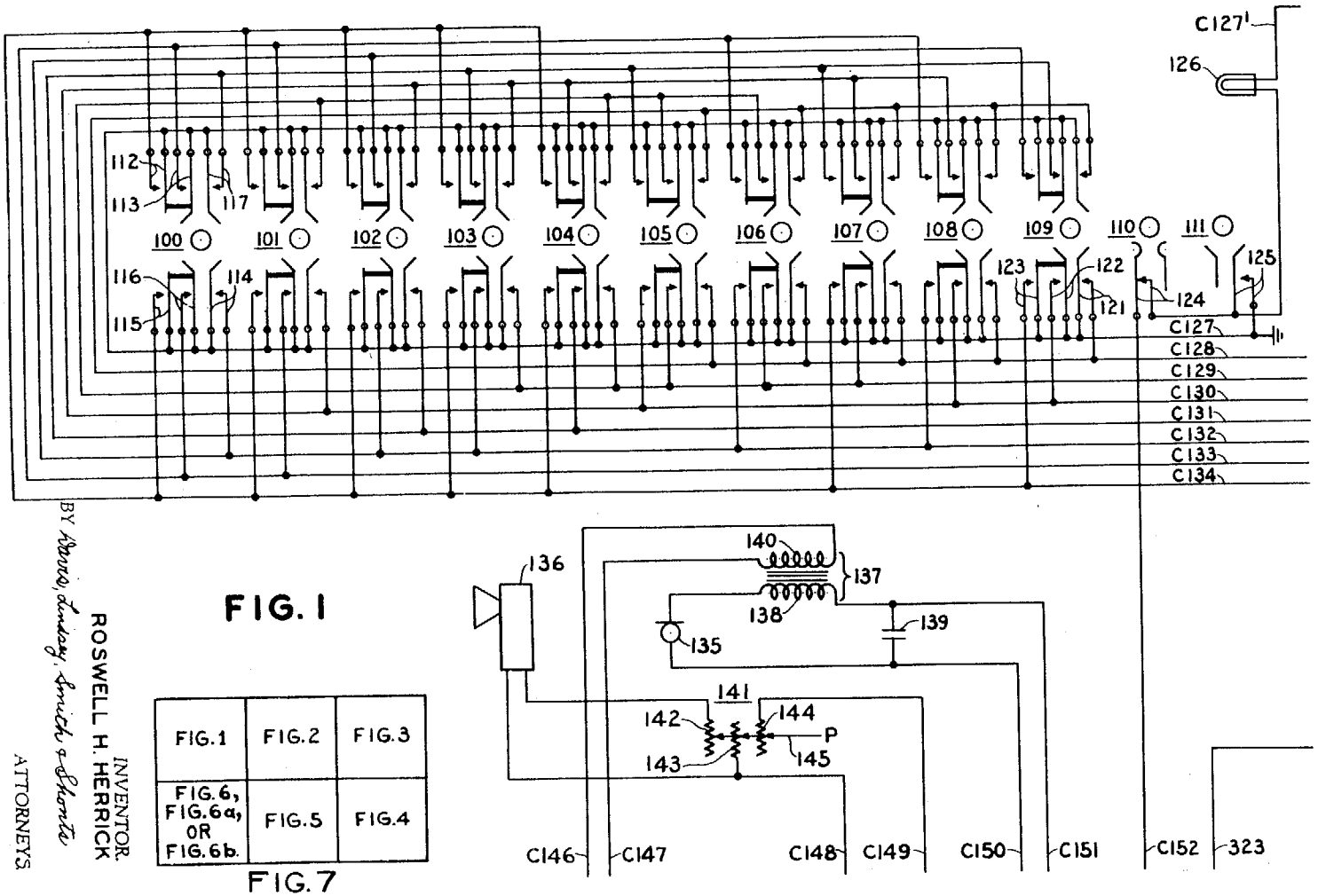

The present invention relates to telephone systems and more particularly to improved telephone apparatus for providing simplified and more direct calling facilities between the telephone substation of an important executive or official and the telephone substations of subordinates who are frequently called from the executive telephone substation.

As explained in Patent No. 1,633,166—Clarence E. Lomax, granted June 21, 1927, it sometimes occurs that one party located at a given substation may have occasion to call the telephones of a particular group of other parties at frequent intervals. This is particularly true of an executive who relies upon telephone facilities to secure information from his immediate subordinates. In a situation of this character, the delay incident to the operation of a manual system or the labor incident to the operation of the calling device in automatic systems may prove burdensome to the party initiating the calls. In order to simplify the calling operation, the improved direct call system disclosed in the above-mentioned patent was developed. This system is so arranged that calls to a number of telephones may be initiated at the special substation either by using a conventional dial operated calling device or by the simple expedient of selectively actuating calling keys individually corresponding to the telephones which are frequently called. In the disclosed arrangement, a single line extends to the executive substation and only one set of transmitting and receiving means is provided for use in communicating over the line. Hence, only a single call can be handled at any one time. In many cases, it is desirable that two calls be simultaneously handled at the special or executive substation. Due to the ease of operation and convenience in using, it is also frequently desirable to provide, at a substation of the character mentioned, auxiliary transmitting means and auxiliary receiving means, including an amplifier and a loud speaker, which auxiliary transmitting and receiving means are arranged to be used in lieu of the regular substation transmitter and receiver and may be conditioned for operation and used without removing a hand set or receiver from an associated supporting hook or cradle. It is further desirable to be able to connect and arrange the auxiliary transmitting and receiving means so that they may operatively be included in either of two established connections, without releasing either of the two connections.

It is an object of the present invention to provide, in a telephone system, improved apparatus of the general character briefly described above which is so arranged that two communication connections may simultaneously and easily be established between a special substation and two different lines of the system and in which either of two sets of transmitting and receiving means may be used in communicating over either of the two established connections.

It is a further object of the invention to provide in an arrangement of the character described, improved apparatus for selectively connecting one set of transmitting and receiving means to be used in communicating over either of two established connections respectively extending between the substation at which the transmitting and receiving means are located and two different lines of the system.

It is a still further object of the invention to provide, in an arrangement of the character described, a substation comprising auxiliary transmitting means and auxiliary receiving means including a signal amplifier, together with improved apparatus for permitting the auxiliary transmitting and receiving means to be used to the fullest extent on calls incoming to and outgoing from the substation.

The invention is illustrated as being incorporated in an automatic telephone system including an exchange at which the plurality of lines of the system terminate. One of the lines of the system extends to a special or executive substation of the character mentioned above. Automatic switching equipment of the impulse responsive type is provided in the exchange for establishing connections between the lines extending to the exchange, the arrangement being such that the automatic switching equipment is controllable from the executive substation or by way of any of the lines extending to the exchange, to establish communication connections between the executive substation and the lines. There is also provided in the exchange, special automatic switching means having access only to the group of subordinate lines to which calls are frequently initiated at the executive substation. This special automatic switching means is individual to the executive substation and is controllable only from this substation to establish a second communication connection between the substation and a second of the lines extending to the exchange. This second communication connection may be set up in the absence of a connection of the first type as mentioned above, or may be set up while a connection of the first type exists and without releasing the same. More specifically, there is provided, at the executive substation, a plurality of key operated calling switches which individually correspond to the subordinate lines forming the group accessible to the automatic switching means mentioned above, and control apparatus operative in response to the operation of any one of the calling switches for causing the special switching means to extend a connection from the executive substation to the particular one of the subordinate lines corresponding to the operated calling switch. For the purpose of communicating over a connection of the first type, there is provided, at the special or executive substation, the usual transmitter and receiver, which two elements are normally connected and arranged to be used in conversing over a connection of the first type. Auxiliary transmitting and receiving means are also provided at the special substation which are normally connected and arranged to be used in communicating over a connection of the second type. The auxiliary receiving means comprises a signal amplifier and a loud speaker, the input circuit of the signal amplifier being interconnected with the auxiliary transmitting means and an anti-side-tone impedance network to form a substation circuit arranged for side tone suppression. The arrangement is such that the signal amplifier is conditioned for operation in response to the operation of any one of the calling switches to a position corresponding to one of the called subordinate lines.

Three different embodiments of the invention are disclosed, in all of which means are provided for operatively connecting the auxiliary transmitting and receiving means to be used in communicating over either of the two type of connections briefly described above. More particularly, a pair of relays are provided which are under the control of manually operable answer and transfer switches located at the substation and are operative selectively to connect the auxiliary transmitting and receiving means to be used in communicating over an established connection of either type. The arrangement is such that the two relays are jointly operative to transfer the auxiliary transmitting and receiving means from a connection of one type of a connection of the other type, and one of the two relays is operative to condition the signal amplifier provided in the auxiliary receiving means for operation. The answer switch includes contacts for completing the operating circuits of both relays, and the transfer key switch includes contacts for interrupting the operating circuit of the transfer relay without deenergizing the other relay, thus providing an arrangement wherein the desired transfer of the auxiliary transmitting and receiving means may be effected by selective operation of the answer and transfer switches. In one embodiment of the invention the regular substation transmitter and receiver can only be used in communicating over a connection of the first type, namely a connection estabilshed in response to the operation of the calling device provided at the executive substation or a connection established on a call incoming to the substation. In the second embodiment of the invention, a manually operable switch is provided at the executive substation, together with means operative in response to the operation of the switch for connecting the regular substation transmitter and receiver to be used in communicating over a connection of the second type, namely, a direct call connection. In the third embodiment of the invention, there is provided a relay which is operative in response to the removal of the substation receiver from its supporting hook or cradle to connect this receiver to be used in communicating over a connection of the second type, namely, a direct call connection. In accordance with a more specific feature of the invention, the above-mentioned relay is provided with a holding circuit which is arranged to be completed in response to the operation of the relay and serves to deliver energizing current to the substation transmitter following its completion. This relay also includes a set of contact springs for preventing alternating current energy from being delivered to the input circuit of the auxiliary receiving means when the relay occupies its operated position.

The arrangement of the apparatus is such that an established connection, extending between the special substation and one of the subordinate substations and including the special switching means mentioned above, is only locally interrupted at the subordinate substation in response to the usual release operation performed thereat, the switching equipment involved in the connection being held operated until a release operation is performed at the special substation. In order to prevent a subordinate from hanging up and then reestablishing the connection for the purpose of listening in on a conversation ensuing at the executive or special substation, there is provided in the special switching means, apparatus responsive to a release operation performed at the subordinate substation for rendering the established connection ineffective to transmit signal frequency currents from the executive substation to the subordinate substation.

Further features of the invention pertain to the particular arrangement of the apparatus whereby the above and additional operating features are attained.

Figure 2:
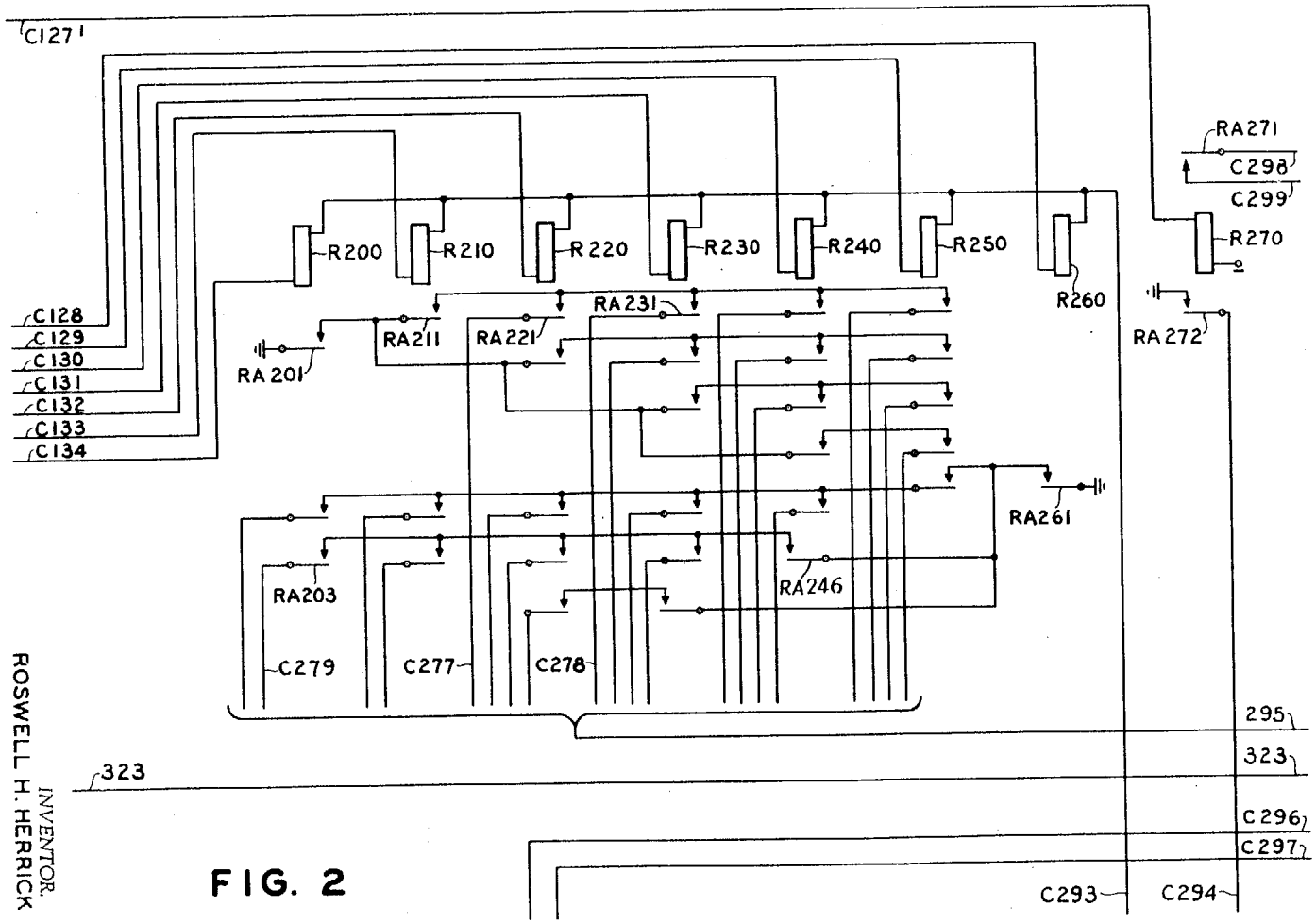
Figure 3:
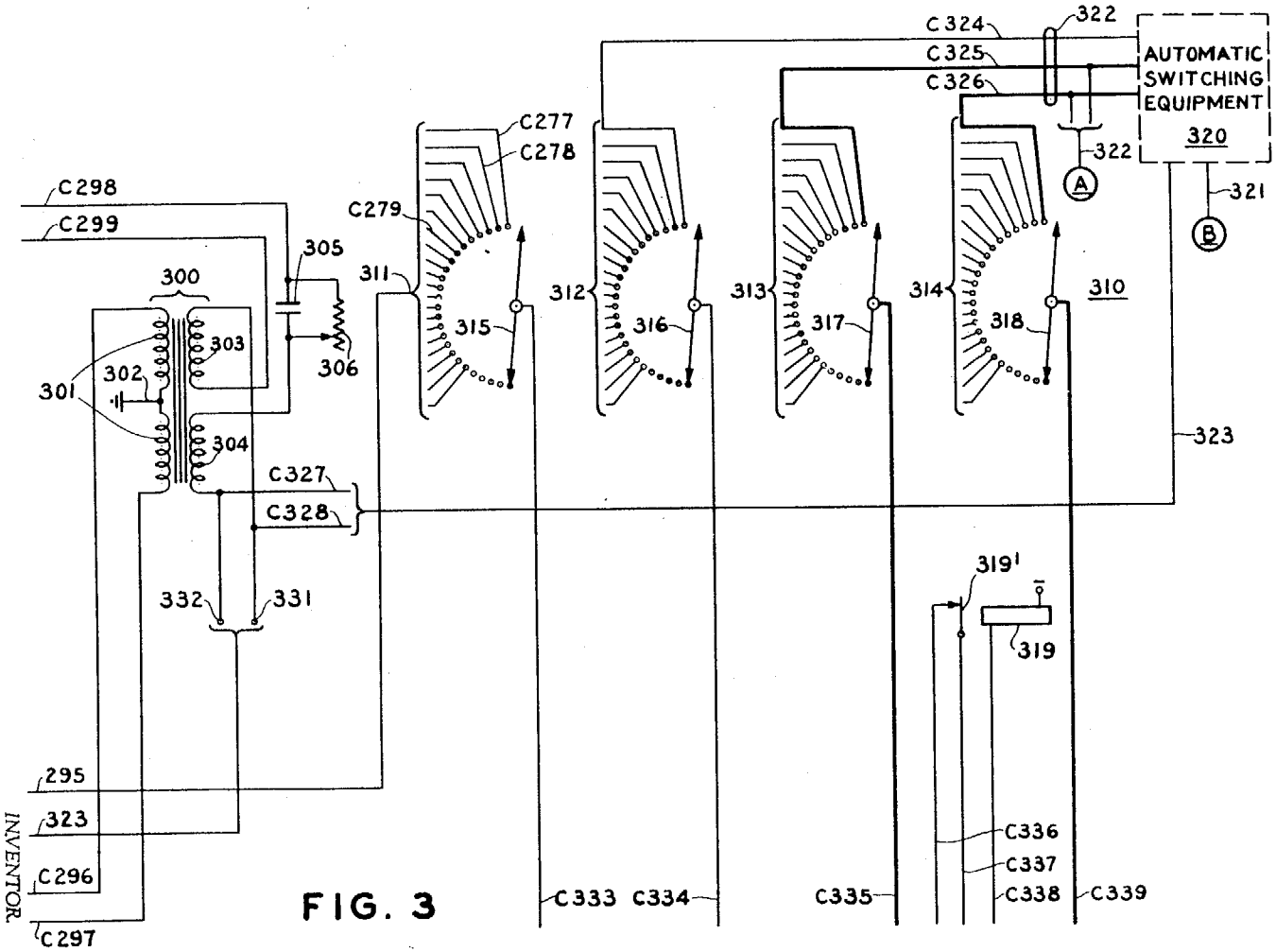
Figure 4:
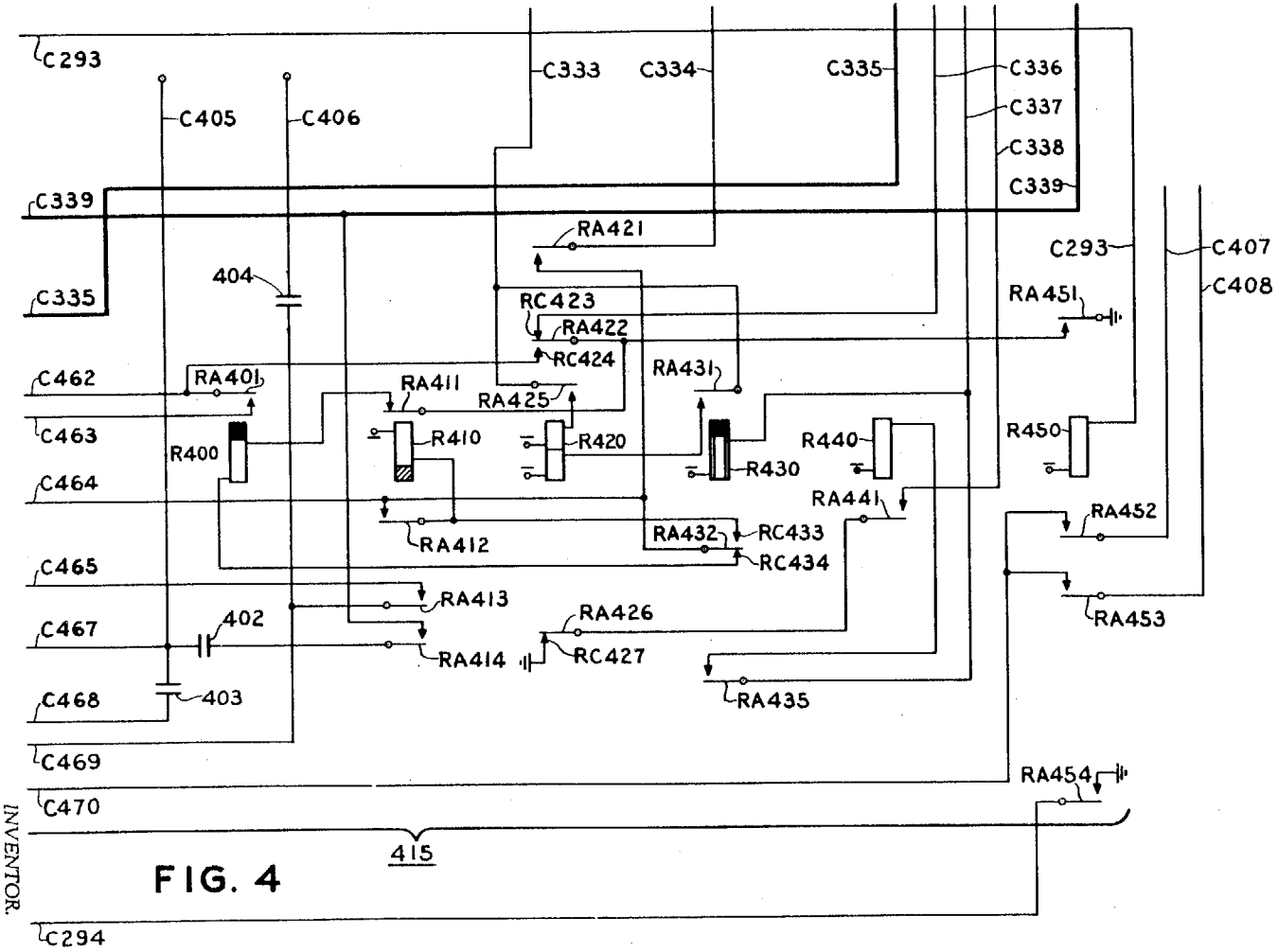
Figure 5:
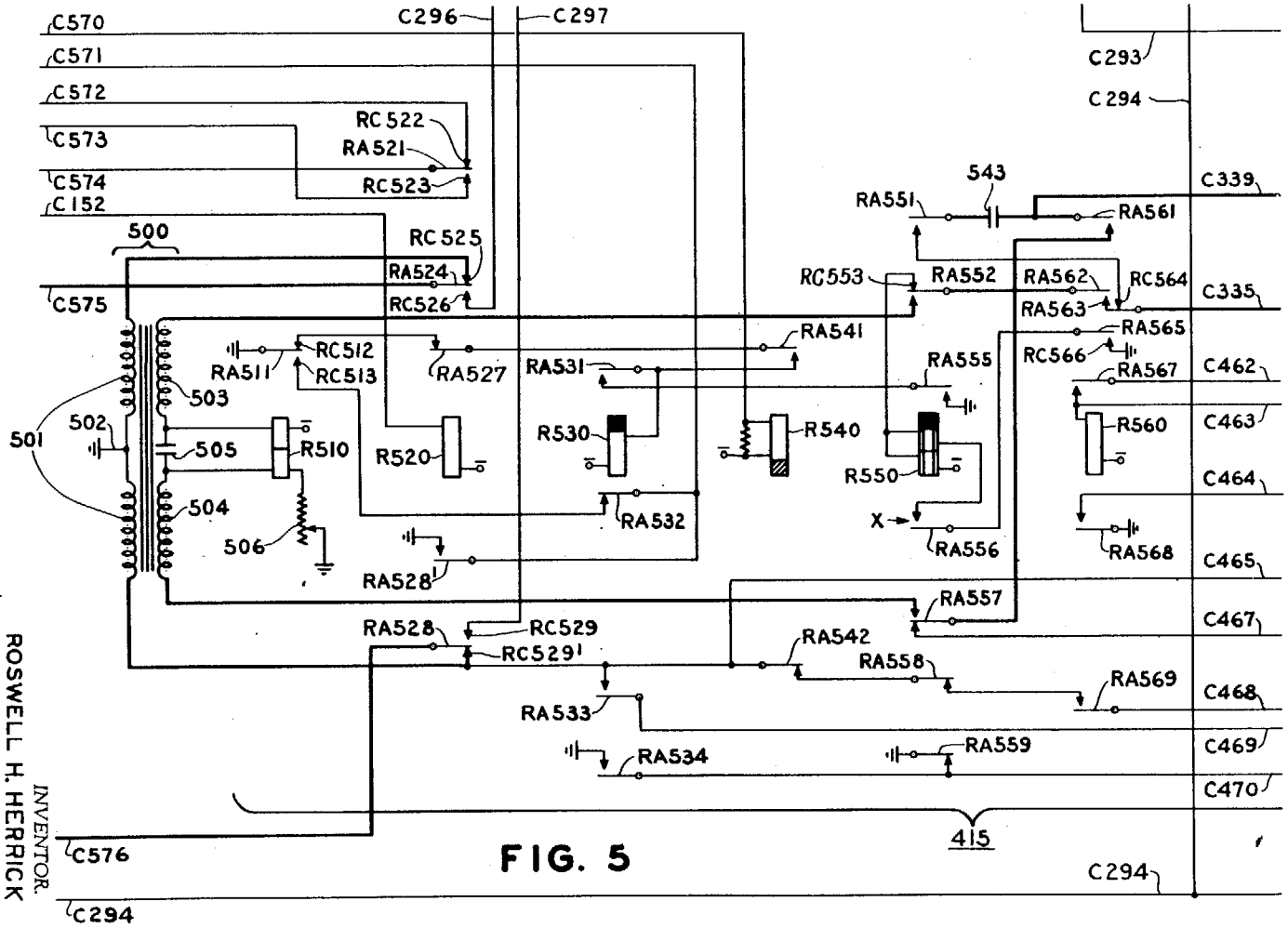
Figure 6:
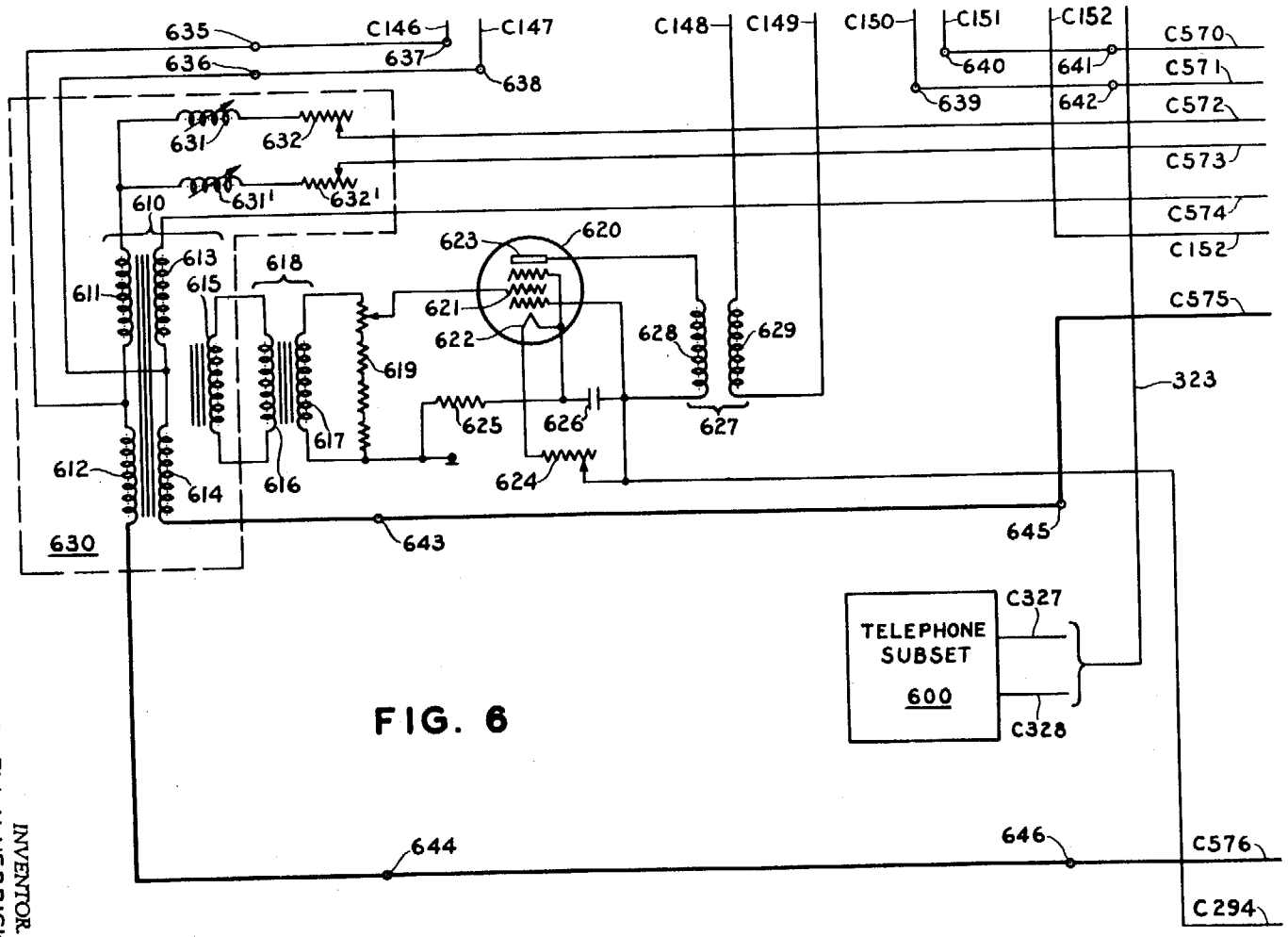

The novel features believed to be characteristic of the invention are set forth with particularity of the appended claims. The invention, both as to its organization and method of operation, together with further objects and advantages thereof, will best be understood by reference to the specification, taken in connection with the accompanying drawings, in which Figures 1 to 6, inclusive, taken together, illustrate a telephone system having incorporated therein the above-outlined features of the present invention; Figs. $6_a$ and $6_b$ are modifications of the apparatus shown in Fig. 6; and Fig. 7 is a diagram illustrating the manner of assembling the other figures of the drawings. More specifically, Figs. 1 and 6 illustrate the apparatus provided at one of the master telephone stations of the system. Figs. 3 to 5, inclusive, illustrate the circuit arrangement of the link circuit and switching apparatus individual to the telephone station shown in Figs. 1 and 6, and Fig. 2 illustrates the line selecting relay equipment through operation of which the automatic switching apparatus shown in Figs. 3 to 5, inclusive, is controlled to select a desired called line.

Referring now more particularly to Figs. 1 to 6 of the drawings, the equipment there illustrated is, with the exception of the substation apparatus shown in Fig. 1 and the substation apparatus 600 shown in Fig. 6, included in an automatic exchange of the type frequently used to provide telephone facilities between the offices of a large manufacturing organization. This type of exchange is commonly known as a private automatic exchange. Extending to the exchange and terminating in automatic switching equipment diagrammatically illustrated at 320, are a plurality of substation lines, three of which are indicated at 321, 322 and 323. The ends of the lines remote from the exchange terminate in substations of the automatic type, that associated with the line 321 being diagrammatically illustrated at B and that associated with the line 322 being indicated at A. The line 323 extends to a special or executive substation of the character mentioned above and includes two line conductors C327 and C328 terminating in the telephone substation apparatus diagrammatically illustrated at 600. The automatic equipment 320 comprises the usual subscriber-controlled automatic switches for setting up connections between the telephone lines of the system. More particularly, these switches are, in accordance with conventional practice, divided into two classes, namely, nonnumerical switches, such, for example, as line finder or line switches, and numerical switches, such, for example, as selector and connector switches, which latter switches are responsive to impulses transmitted thereto over calling ones of the telephone lines and function to perform the usual line group, subgroup and unit selecting operations. The connector switches at which the lines terminate are, in accordance with conventional practice, equipped to perform the usual auxiliary functions of: testing a selected called line to determine the idle or busy condition thereof, returning busy tone over the calling line in the event a selected called line is found busy, and projecting ringing current over a selected called line to actuate the signal device at the substation in the event the called line is idle at the time it is tested.

The substation apparatus 600 and the apparatus provided at each of the substations A, B, etc., may be of any desired commercial construction and arrangement. In brief, this apparatus may comprise the usual hand set type of transmitter and receiver, a cradle or hook comprising supporting means for the receiver, a cradle or hook switch, a ringer, and an impulsing device for transmitting switch control impulses by way of the associated lines to the automatic switching equipment 320 located in the line terminating exchange. Preferably, the elements of each substation circuit are connected and arranged to form the well-known anti-side-tone circuit, whereby operation of the substation transmitter does not cause operation of the substation receiver.

As pointed out above, the present invention relates to the provision of improved apparatus for increasing the utility of the available telephone facilities at the executive substation where the substation apparatus 600 is located. With the apparatus thus far described, communication connections may be established between the executive substation and any of the other substations associated with lines terminating at the automatic switching equipment 320 in the usual manner. More particularly, on regular calls initiated at the executive substation, the calling device or dial operated impulsing device included in the apparatus 600 is actuated in the usual manner causing impulse trains to be transmitted to the automatic switching eqipment 320. This equipment responds to the impulse trains by routing the connection to the desired called line. All calls incoming to the executive substation are routed by way of the regular automatic switching equipment 320 provided in the exchange and the line 323 to the substation apparatus 600, the signal device or ringer embodied in this apparatus being energized in response to ringing current projected over the line 323 following seizure of the line by one of the connector switches included in the automatic switching equipment 320.

For the purpose of routing calls from the executive substation directly to certain of the frequently called subordinate lines terminating at the automatic switching equipment 320 without operating a calling device of the type conventionally used in automatic systems and without the delay incident to the operations required to set up a connection in a manual system, there is provided automatic switching means comprising a rotary switch 310 having bank contacts at which the group of subordinate lines terminate. This switch is a standard twenty-five point rotary switch and comprises four sets of bank contacts 311 to 314, inclusive, wipers 315 to 318, inclusive, respectively associated with the enumerated contact sets, and means comprising a motor magnet 319 for driving the enumerated wipers over the contacts of their respective associated sets. As indicated, the contacts in the two sets 313 and 314 terminate the line conductors of the respective subordinate lines which are directly accessible to the executive substation, and the contacts in the set 312 terminate the private or control conductors of the subordinate lines. The contacts of the fourth contact set 311 terminate conductors extending by way of the cable 295 to the contact springs of a group of coding relays shown in Fig. 2. These conductors individually correspond to the subordinate lines and are included in marking circuits by means of which operation of the switch 310 is controlled. Since the control apparatus described hereinafter is only arranged to provide direct calling facilities to twenty subordinate lines only twenty of the contacts of each contact set embodied in the switch 310 are used, the remaining contacts being left blank. The switch 310 is arranged to be controlled by the group of coding relays shown in Fig. 2 and by the control apparatus 415 illustrated in Figs. 4 and 5. More particularly, the coding relays shown in Fig. 2 and indicated at R200, R210, R220, R230, R240, R250 and R260, respectively, are arranged to be energized in combinations of three in response to the selective operation of any one of the plurality of calling switches illustrated in Fig. 1. These switches, which are indicated at 100 to 109, respectively, individually correspond to the lines forming the group of subordinate lines directly accessible to the executive substation. Each of the enumerated calling switches is of the key operated type and is operable from a normal position to either of two off-normal positions individually corresponding to two subordinate lines. Each of the switches is of the well-known locking type, such that, when once operated to an off-normal position, it remains in operated position until manually restored to normal. The contact springs of the calling switches are wired in the manner illustrated so that, when any one thereof is operated to one of its two off-normal positions, three of the coding relays shown in Fig. 2 are caused to operate in the manner described in detail hereinafter to complete one of the above-mentioned marking paths extending to one of the contacts in the set 311 of the rotary switch 310, thereby to identify the called line desired by the calling party.

The line wipers 317 and 318 of the rotary switch 310 are arranged to be connected by way of a link line comprising the conductors C335 and C339 to a repeating transformer 500 through operation of the control apparatus indicated generally at 415. This apparatus comprises a start relay R450 which is arranged to be energized in response to any one of the calling switches shown in Fig. 1 and functions to initiate the operation of the rotary switch 310 to select a desired called line. Operation of the rotary switch is controlled by the three relay R420, R430 and R440, of which the relays R430 and R440 directly control the stepping operation of the switch 310 and the relay R420 is a test relay for arresting the operation of the rotary switch when its wipers are operated to a position corresponding to a desired called line. The relay equipment also includes a pair of relays R400 and R410 which function to test the condition of a selected called line to determine whether it is idle or busy. More particularly, the slow-to-release relay R410 is a busy relay which is operative to return busy tone to the executive substation in the event a selected called line is found busy, and the slow-to-operate relay R400 is operative in the event a selected called line is found idle and is arranged to control the ringing relay R560, shown in Fig. 5. The busy relay R410 also functions as a device for impressing a background signal on an established connection involving a busy subordinate line called from the executive substation. The apparatus 415 also includes a ring cutoff relay R550 and a back bridge or called party answer relay R510, which relays are arranged to perform the functions conventionally required of relays of this character.

As indicated above, auxiliary transmitting and receiving means are provided at the executive substation for use in communicating over connections established through operation of the auxiliary or special switching means just described. The auxiliary transmitting means comprises a microphone 135, and the auxiliary receiving means comprises a sound reproducing device in the form of a loud speaker, diagrammatically illustrated at 136, connected in tandem with a signal amplifier including the vacuum tube 620. The auxiliary transmitting and receiving means are interconnected with an anti-side-tone impedance network indicated generally at 630 to form a substation circuit of the well-known anti-side-tone type having line terminals 643 and 644 arranged to be connected by way of a link line including the conductors C575 and C576 to one winding of the repeating transformer 500 or by way of a second link line comprising the conductors C296 and C297 to one winding of a second repeating transformer 300, shown in Fig. 3. More particularly, the anti-side-tone impedance network 630 comprises an induction coil or transformer 610 including five windings 611 to 615, inclusive, the last-mentioned of which is coupled to the primary winding 616 of an input transformer 618 having its secondary winding 617 connected across the non-adjustable terminals of a voltage dividing resistor 619. The adjustable terminals of the resistor 619 are coupled to the control grid 621 and the cathode 622 of the tube 620.. The tube 620, which is of the well-known pentode type and includes a directly heated cathode, is provided with an output circuit comprising the primary winding 628 of an output transformer 627 connected in series with a source of anode potential between the anode 623 and the cathode 622. For the purpose of biasing the control grid 621 negatively with respect to the cathode 622, there is provided a resistor 625 which is commonly included in the output circuit of the tube and the energizing circuit for the cathode 622. The anode current source is by-passed for signal frequency currents by a condenser 626. The secondary winding 629 of the transformer 627 is connected to impress the signal voltage developed thereacross upon the input terminals of the loud speaker 136 through a volume control network 141. This network includes three resistors 142, 143 and 144 and an adjustable contact carrying arm 145 so arranged that adjustment of the arm 145 varies the magniture of the signal voltage impressed upon the input terminals of the loud speaker 136 without substantially changing the value of the resistance connected in shunt with the transformer secondary winding 629. By this arrangement, adjustment of the signal input level to the loud speaker 136 may be achieved, in a well-known manner, without changing the output impedance into which the tube 620 operates and, hence, without introducing distortion into the reproduced output of the loud speaker 136.

The anti-side-tone impedance network 630 includes, in addition to the transformer 610, a pair of line balancing circuits which are arranged selectively to be operatively included in the network and are individually effective, under different operating conditions, to balance the circuit so that, during operation of the microphone 135, no substantial portion of the developed signal voltage is impressed on the input circuit of the amplifier tube 620. The first of the two balancing network comprises an adjustable inductance element 631 connected in series with an adjustable resistor 632, and the second network similarly comprises an adjustable inductance element 631' connected in series with an adjustable resistor 632'. As shown, the transmitter microphone 135 is included in a substantially closed transmission circuit comprising this microphone, a low impedance condenser 139, and the primary winding 138 of a coupling transformer 137. This transformer is provided with a secondary winding 140, one terminal of which is connected by way of the conductor C146 to the junction point between the two transformer windings 611 and 612 and the other terminal of which is connected by way of the conductor C147 to the junction point between the two transformer windings 613 and 614. The two junction points noted form the conjugate terminals of the anti-side-tone bridge circuit which is effectively formed when the auxiliary substation equipment is included in an established connection. More particularly, signal currents traversing the secondary winding 140 of the transformer 137 during operation of the microphone 135 divide at the two junction points noted, portions of the currents traversing a path comprising the two windings 611 and 613 and one of the two balancing circuits, described above, and other portions of the currents traversing the two windings 612 and 614 and the established loop circuit extending to the repeating transformer 500 or the repeating transformer 300. By suitably proportioning the impedance values of the elements respectively included in the two balancing circuits, the currents traversing the windings 613 and 614 are rendered substantially equal in magnitude and opposite in phase at all frequencies within the audio range irrespective of which of the two repeating transformers 300 and 500 is included in the established connection. Similarly, when the impedance values of the elements included in the balancing circuits are proportioned in the manner indicated, the signal currents respectively traversing the two windings 611 and 612 are rendered substantially equal in magnitude and opposite in phase at all frequencies within the audio range. Thus, during operation of the transmitter microphone 135, the currents traversing the windings 611, 612, 613 and 614 cause substantially equal and opposite signal voltages to be induced in the secondary winding 615, so that substantially no signal energy is delivered to the input circuit of the vacuum tube 620. By virtue of this arrangement, suppression of the side tone is achieved.

For the purpose of utilizing the auxiliary transmitting and receiving means to answer calls incoming to the executive substation and routed by way of the substation line 323, and for the further purpose of permitting the auxiliary transmitting and receiving means selectively to be connected for use in communicating over either of two simultaneously established connections, each extending to the executive substation, there are provided an answer switch 111, a transfer switch 110, the repeating transformer 300, the link line comprising the two conductors C296 and C297, and the two control relays R270 and R520. The key operated answer switch 111 is of the well known locking type and the key operated transfer switch 110 is of the non-locking type. Both of the two relays R270 and R520 are arranged to be energized in response to the operation of the answer switch 111, the first thereof being operative to condition the signal amplifier comprising the tube 620 for operation, and also to complete an auxiliary loop circuit extending to a distant subordinate substation and terminated at the windings 303 and 304 of the repeating transformer 300. Arranged to be serially included in an established auxiliary loop circuit is an adjustable resistor 306 for conducting direct current and by-passed for signal frequency currents by a condenser 305. The relay R270 conditions the signal amplifier for operation by supplying anode and cathode energizing voltages to the tube 620 over circuits traced hereinafter. In this regard, it is pointed out that the tube 620 is of the well-known C–33 type, which type of tube requires only a low anode voltage to provide reasonably good amplification. Hence, the exchange battery is used to supply anode and screen voltages to this tube. The exchange battery also supplies energizing current to the cathode 622 of the tube, a voltage dropping resistor 624 being serially included in the cathode energizing circuit for the purpose of fixing the resistance of the circuit so that the rated current of the cathode heater traverses the circuit.

The relay R520, which is energized in response to operation of the answer switch 111 and deenergized in response to the subsequent operation of the transfer switch 110, is arranged to transfer the link line C575, C576, leading to the input terminals 643 and 644, from a connection with the winding 501 of the repeating transformer 500 to a connection with the winding 301 of the repeating transformer 300. This relay also functions selectively to include the two balancing circuits, described previously, in the anti-side-tone impedance network 630 in the manner pointed out more in detail hereinafter. In order to remind a user of the executive substation equipment that the answer switch 111 is in its operated or off-normal position, there is provided a signal lamp 126 which is arranged to be energized in response to the operation of the switch 111 to its off-normal position.

For the purpose of preventing an established connection extending to one of the subordinate substations from being reestablished after the usual release operation is performed at the subordinate substation and before the connection is released at the executive substation, there are included in the control apparatus 415 two relays R530 and D540, the first of which is of the slow-to-operate type, and the last-mentioned of which is of the slow-to-release type. More particularly, current for energizing the transmitter microphone 135 is normally supplied to this microphone over a circuit including the winding of R540. When, however, a release operation is performed at a subordinate substation involved in an established connection extending to the executive substation, the relay R540 cooperates with the back bridge relay R510 to cause the operation of the relay R530, and the last-mentioned relay functions to open the circuit for supplying energizing current to the transmitter microphone 135 and to maintain this circuit open so long as the connection is not released at the executive substation.

Although the apparatus shown in detail in Figs. 1 to 6, inclusive, may be arranged in any desired manner, it is contemplated that only the apparatus shown in Fig. 1 and the substation apparatus 600 shall be located in the office of the executive for whose use it is provided. It is further contemplated that the remaining apparatus illustrated in the drawings shall be conveniently located in the exchange terminating the various lines of the system, a suitable multi-conductor cable being provided for interconnecting the circuit elements to provide the circuit arrangement depicted in the drawings and described above.

Referring now more particularly to the operation of the special switching equipment to establish a connection to one of the regular automatic substations and assuming that the substation A is being called, the call is initiated by operating the calling switch 100 to the particular off-normal position corresponding to the called substation. More particularly, if the substation A is being called, the key switch 100 is operated from its normal position to its lower off-normal position to close the springs of the three sets 114, 115 and 116. As indicated above, three of the coding relays illustrated in Fig. 2 respond to the operation of any one of the key switches to an off-normal position to provide a marking path for marking the particular called line in the contact level 311 of the rotary switch 310. In the case under consideration, when the springs 114, 115 and 116 are closed, circuits are completed for energizing the three relays R200, R210 and R220, which circuits commonly include the winding of the start relay R450. The operating circuits for the three relays noted may be considered as a single circuit extending from battery at the lower terminal of the winding of R450 by way of this winding to C293, where it divides; one branch extending by way of the winding of R220, C132 and the springs 114 to the grounded conductor C127; a second branch extending by way of R210, C133 and the springs 116 to the grounded conductor C127; and the third branch extending by way of R200, C134 and the springs 115 to the grounded conductor C127. When energized over the above-traced circuits, the four relays R200, R210, R220 and R450 operate and the first three thereof function to complete a marking path identifying the line 322 as the line being called. This marking path extends from ground at RA201 by way of RA211, RA221, and C277 to the twenty-fifth contact of the contact set 311. Due to the above-described arrangement of the coding relays, none of the other marking paths individually corresponding to the other lines directly accessible to the special equipment are completed.

As a further example of the manner in which the coding relays operate in response to selective operation of the calling switches, it is pointed out that if the switch 100 is operated to close the contact springs 112, 113 and 117 a series-parallel circuit is completed for energizing the three coding relays R200, R210 and R230, and the start relay R450. In this case the two relays R200 and R210 are energized over circuits substantially similar to the branch circuits traced above and the relay R230 is energized over a branch circuit extending by way of C293, the winding of R230, C131 and the contact spring 117 to the grounded conductor C127. When the three relays R200, R210 and R236 operate, a marking path is completed for applying ground potential to the twenty-fourth contact of the set 311, this path extending from ground at RA201 by way of RA211, RA231 and C278 to the twenty-fourth contact of the set 311.

Again, if the tenth calling switch 109 is operated to its lower off-normal position, the springs 121, 122 and 123 are closed to complete a series-parallel circuit for energizing the three relays R200, R240 and R260 in series with the relay R450. In this case the relay R200 is energized over a branch circuit extending by way of C134 and the springs 123 to the grounded conductor C127; the relay R240 is energized over a branch circuit extending by way of C130 and the springs 122 to the grounded conductor C127; and the relay R260 is energized over a branch circuit extending by way of C128 and the springs 121 to the grounded conductor C127. Upon operating, the three relays complete a path extending from ground at RA261 and by way of RA246, RA203 and C279 for impressing marking ground on the nineteenth contact on the contact set 311. It will be apparent from the foregoing description that by selectively operating the calling switches, the coding relays may be caused to operate in different combinations of three, thereby selectively to complete the twenty marking paths extending to the respective contacts of the contact set 311.

In any case when three of the coding relays are energized the start relay R450 is also energized and, upon operating, completes, at RA452 and RA453, respectively, paths commonly including the grounded armature RA559 and C470 for applying ground to the tone apparatus and ringing machine start conductors C407 and C408, thereby to initiate the operation of the tone apparatus and the ringing apparatus in the usual manner. At RA454, the relay R450 applies ground to the amplifier start conductor C294, thereby to condition the amplifier comprising the tube 620 for operation. More particularly, operation of the relay R450 results in the connection of the positive terminal of the exchange battery to C294, so that anode potential is impressed through the primary winding 628 of the output transformer 627 on the anode 623 of the vacuum tube 620. Operation of the relay R450 also results in the completion of a circuit for energizing the cathode 622 of the tube 620, this circuit extending from the grounded positive terminal of the exchange battery at RA454 by way of C294, the voltage dropping resistor 624, the cathode 622 and the biasing resistor 625 to the negative terminal of the exchange battery. It will be noted that positive screen potential is applied to the screen electrode of the tube 620 directly from the positive terminal of the exchange battery over the path including the conductor C294.

At RA451, the relay R450 completes a circuit for energizing the slow-to-operate relay R430, this circuit extending from ground at RA451 by way of RA422, RC423, C336, the armature 319', C337 and the winding of R430 to battery. The relay 430 operates, after an interval, and, at RA431, prepares a circuit, traced hereinafter, for energizing the relay R420 when the wipers of the rotary switch 310 are stepped to the position corresponding to the selected called line 322. At RA432 and RC433, the relay R430 also prepares a test circuit, traced hereinafter, for energizing the busy relay R410 in the event the selected called line is busy at the time the switch 310 is operated to the position corresponding to the called line. At RA435, the relay R430 completes a circuit for energizing R440, this circuit extending from ground at RA451 by way of RA422, RC423, C336, the armature 319', C337, RA435 and the winding of R440 to battery.

When energized over the circuit just traced, the relay R440 operates to complete, at RA441, a circuit for energizing the motor magnet 319 of the switch 310, this circuit extending from ground at the grounded contact RC427 by way of RA426, RA441, C338, and the winding of the magnet 319 to battery. Upon operating, the magnet 319 steps the wipers 315 to 318, inclusive, of the switch 310 one step and interrupts, at its associated armature 319', the above-traced operating circuits for the two relays R430 and R440. The relay R440 immediately restores to interrupt, at RA441, the operating circuit as traced above for the magnet 319, whereupon this magnet restores its associated armature 319' to recomplete the operating circuits for the two relays R430 and R440, respectively. When the operating circuit for R440 is again completed, this relay operates to recomplete the above-traced circuit for energizing the magnet 319, causing this magnet to again step the enumerated wipers of the switch 310 a second step and to again interrupt the operating circuits for the two relays R430 and R440. The above-described interaction between the relay R440 and the magnet 319 continues until such time as the wipers of the switch 310 are stepped to the position corresponding to the called line 322, or until the wiper 315 is moved into engagement with the contact marked with ground over the above-traced marking path. During the interaction between the relay R440 and the magnet 319, the relay R430, due to its slow-to-release characteristic, stays operated.

When the wiper 315 of the switch 310 is operated into engagement with its associated twenty-fifth contact, the above-mentioned circuit is completed for energizing the relay R420, this circuit extending from the grounded conductor C277 by way of the twenty-fifth contact of the set 311, the wiper 315, C333, RA431 and the lower winding of R420 to battery. When its lower winding is energized over the circuit, just traced, the relay R420 immediately operates to interrupt, at RA426 and RC427, the above-traced circuit for energizing the magnet 319, thereby to arrest the interaction between this magnet and the relay R440 and to prevent further movement of the wipers embodied in the rotary switch 310. At RA425, the relay R420 completes a holding circuit for itself, this holding circuit extending from the grounded conductor C333, by way of RA425 and the upper winding of R420 to battery. At RA422 and RC423, the relay R420 interrupts a point in the circuits over which R430 and R440 are being held energized, causing these two relays to restore. At RA422 and RC424, the relay R420 prepares a holding circuit, traced hereinafter, for R560.

At RA421, the relay R420 completes the above-mentioned circuit for testing the called line 322 to determine the idle or busy condition thereof. In this regard it is pointed out that the automatic switching equipment provided in the exchange 320 is conventionally arranged so that, when the line 322 is busy, ground potential is present upon the control conductor C324 thereof, whereas, if the line is idle, battery potential appears on this control conductor. Assuming the selected called line 322 is busy, the busy relay R410 is energized over the above-mentioned test circuit, which circuit extends by way of the control conductor C324, the twenty-fifth contact of the set 312, the wiper 316, C334, RA421, RA432, RC433 and the winding of R410 to battery. Upon operating, the busy relay R410 interrupts, at RA411, a point in the circuit, traced hereinafter, for energizing the slow-to-operate control relay R400. At RA412, the relay R410 completes a holding circuit for itself, this circuit extending by way of the conductor C334, RA421, RA412 and the winding of R410 to battery.

The relay R410, upon operating, functions to complete a circuit for impressing busy tone voltage on the input circuit of the signal amplifier comprising the vacuum tube 620. Specifically, the path of the busy tone current extends from the ungrounded terminal of the busy tone source, not shown, by way of the busy tone conductor C406, the condenser 404, RA413, C465, RC529′, RA528, C576, the transformer windings 612 and 611, the inductance element 631, the resistor 632, C572, RC522, RA521, C574, the transformer windings 613 and 614, C575, RA524, RC525 and the upper half of the winding 501 to the grounded terminal of the busy tone source at the grounded center tap 502 of the winding 501. This current causes an induced voltage to be developed in the transformer winding 615 which is impressed through the coupling transformer 618 between the input electrodes of the tube 620, and the amplified output energy is delivered through the transformer 627 and the volume control network 141 to the loud speaker 136 for reproduction. The reproduced busy tone signal indicates to the calling party that the desired connection can not immediately be established.

Presumably, the substation at which the illustrated special equipment is located is that of an important official or executive, such that calls originating at this substation and intended for the various subordinate lines are of sufficient importance to warrant direct attention on the part of the called parties. For this reason, the busy relay R410 is so arranged that it functions to impress a background signal on a selected subordinate line which is tested and found busy. More particularly, when the relay R410 operates, it completes a path for impressing the voltage of the ringing current source upon the previously established loop circuit of which the followed line forms a part. In the case under consideration, the path of the ringing current extends from the ungrounded terminal of the ringing current source, not shown, by way of the ringing current conductor C405, the condenser 402, RA414, C339, the wiper 318, the twenty-fifth contact of the set 314, the line conductor C326, the receiver at the called substation A, the line conductor C325, and through one winding of the back bridge relay conventionally provided in the operated connector switch of the switch train leading to the line 322, to the grounded terminal of the ringing current source. The condenser 402 included in this path is selected of a value such that the current traversing the above-traced path is unsufficient to produce a signal which will interfere with the ensuing conversation over the established connection including the line 322, but is of sufficient strength to indicate that the substation A is being called from the executive substation.

Following the operation of the busy relay R410, no further operation of the apparatus occurs until the partially established connection is released. To release the connection it is only necessary to restore the operated key switch 100 to its normal position, thereby to interrupt the above-traced operating circuits for the four relays R200, R210, R220 and R450, causing all of these relays to restore. When the first three of the enumerated four relays restore, the above-traced marking path extending to the twenty-fifth contact of the contact set 311 in the switch 310 is interrupted. When this path is interrupted, the holding circuit for R420 is broken, causing this relay to restore to interrupt, at RA421, a point in the above-traced holding circuit for the busy relay R410. Thus, the three operated relays R410, R420 and R450 are caused to restore and the common apparatus 415 is conditioned for further use. In this regard, it will be noted that when the relay R450, restores, it interrupts, at RA454, the path for applying ground to the amplifier start conductor C294, whereby the signal amplifier including the tube 620 is rendered inactive. Upon restoring, the relay R450 also interrupts, at RA451, a point in the operating circuits for R430 and R440 and, at RA452 and RA453, the two paths described above for applying ground to the tone apparatus start conductor C407 and the ringing apparatus start conductor C408.

If the calling party desires he may disregard the busy signal and wait until the established connection is cleared out, in which case the apparatus 415 operates to extend the connection to the called line 322 immediately the called line becomes idle. In this regard it is pointed out that the above-traced holding circuit for the busy relay R410 extends to ground as applied to the control conductor C324. Hence, when the line 322 becomes idle and ground is removed from C324, the holding circuit for R410 is interrupted causing this relay to restore. Upon restoring, the busy relay R410 permits ringing current to be projected over the called line in the manner described immediately hereinafter.

In the event the called line 322 is idle at the time it is selected by the switch 310, battery potential is present on the control conductor C324 thereof and, hence, the busy relay R410 is not energized. A short time interval after the switch 310 is operated to the position corresponding to the line 322 or, more particularly, a short time interval after the relay R420 operates, the slow-to-release relay R430 restores to interrupt, at RA432 and RC433, a point in the previously traced testing circuit by way of which R410 is energized. At RA432 and RC434, the relay R430, upon restoring, completes a circuit for energizing the control relay R400, this circuit extending from ground at RA451 by way of RA411, the winding of R400, RC434, RA432, RA421, C334, the wiper 316 and its associated twenty-fifth contact to battery as impressed upon the control conductor C324 of the idle line 322. Shortly following its energization over the circuit just traced, the slow-to-operate relay R400 operates to complete, at RA401, a circuit for energizing the ringing relay R560, this circuit extending from ground at RA451 by way of RA422, RC424, RA401, C463 and the winding of R560 to battery. Upon operating, the relay R560 completes, at RA567, a holding circuit for itself, which circuit extends from ground at RA451 by way of RA422, RC424, C462, RA567 and the winding of R560 to battery. At RA568, the relay R560, upon operating, applies ground to the control conductor C324 of the called line 322, thereby to mark this line as busy in the bank contacts of the connector switches to which it extends. Specifically, the above-mentioned marking path extends from ground at RA568 by way of C464, RA421, C344, the wiper 316 and its associated twenty-fifth contact to the control conductor C324. At RA565 and its associated grounded contact RC566, the relay R560 prepares a locking circuit, traced hereinafter, for the slow-acting ring cut-off relay R550. At RA561 and RA562, the relay R560 completes a path for projecting ringing current over the called line 322, thereby to energize the signal device at this substation. Specifically, the path traversed by the ringing current extends from one terminal of the ring current source, not shown, by way of C405, C467, RA557, RA561, C339, the wiper 318 and its associated twenty-fifth contact, the line conductor C326, the signal device at the called substation, the line conductor C325, the wiper 317, C335, RA563, RA562, RA552, RC553 and the lower winding of R550 to the other terminal of the ringing current source. The resulting operation of the signal device provided at the called substation indicates that this substation is being called. The relay R560 also completes a path for transforming ring-back-tone energy to the input circuit of the signal amplifier tube 620, this path being substantially the same as that traced previously for the busy-tone current, but extending from the ring-tone source by way of C405, the condenser 403, C468, RA569, RA558 and RA542, rather than by way of C406, the condenser 404, RA413 and C465. The ring-back-tone energy delivered to the input circuit of the amplifier tube 620 is amplified by this tube and delivered to the loud speaker 136 for reproduction, thereby to indicate to the calling party that the desired called substation is being rung.

The desired conversational connection is completed when the call is answered at the called substation A. More particularly, when the receiver at the substation A is removed from its hook, a direct current bridge is placed across the line conductors C325 and C326 of the line 322 to complete a circuit substantially similar to that, traced previously and traversed by the ringing current, for energizing the lower winding of the ring cutoff relay R550. When its lower winding is energized, the relay R550 first closes the "X" contacts associated with RA556, thereby to complete the above-mentioned holding circuit for itself, this circuit extending from ground at RC566 by way of RA565 and the two windings of R550 in series to battery. At RA552 and RA557 and their respective associated resting contacts, the relay R550 opens two points in the above-traced path for projecting ringing current over the selected called line 322 and, in so doing, opens two points in its own operating circuit. At these same armatures and their respective working contacts, the relay R550 extends the called substation loop circuit to the repeating transformer 500, thereby to complete a circuit including this loop circuit for energizing the back bridge or called party answer relay R510.

When the relay R510 operates, it completes, at RA511 and RC513, a circuit for energizing the slow-to-release relay R540, this circuit extending by way of RA532, C571, the terminals 642 and 639, C150, the transmitter microphone 135, the winding 138, C151, the terminals 640 and 641, C570 and through the winding of R540 to battery. Current for energizing the transmitter microphone 135 is conducted to the microphone over the circuit just traced. Upon operating, the relay R540 prepares, at RA541, a circuit, traced hereinafter, for energizing R530. At RA542, the relay R540 opens a further point in a path for conducting ring-back-tone current by way of the anti-side-tone impedance network 630 to the input circuit of the amplifier tube 620.

Following the operation of R540, the desired conversational circuit is completely established, talking battery being supplied to the loop extending to the called substation A through the windings of the back bridge relay R510, and talking battery being supplied to the transmitter microphone 135 over the circuit, traced above, for energizing the relay R540. Signal currents incoming to the special substation and traversing the windings 503 and 504 of the repeating transformer 500 cause inducted voltages to be developed in the winding 501 coupled to the two windings 503 and 504, whereby signal currents corresponding to the incoming signal currents are caused to flow through the anti-side-tone impedance network 630. More particularly, the path followed by currents traversing the winding 501 may be traced as extending from the lower terminal of this winding by way of RC529′, RA528, C576, the two windings 612 and 611, the inductance element 631, the resistor 632, C572, RC522, RA521, C574, the two windings 613 and 614, C575, RA524, RC525, back to the upper terminal of the winding 501. The resulting induced voltages developed in the winding 615 are impressed through the coupling transformer 618 and the voltage dividing resistor 619 between the input electrodes of the amplifier tube 620, thereby to cause corresponding amplified currents to flow in the output circuit of this tube. Such currents cause induced voltages to be produced in the winding 629 of the output coupling transformer 627, which voltages are impressed through the potentiometer network 141 on the input terminals of the loud speaker 136 for reproduction.

Audio frequency currents developed by operation of the microphone 135 are caused to circulate in the closed low impedance transmission circuit comprising the primary winding 138 of the transformer 137 and the condenser 139. Such currents cause corresponding induced voltages to be developed in the secondary winding 140 of the transformer 137 which are impressed by means

79, TELEPHONY, of the two conductors C146 and C147 between opposite terminals of the anti-side-tone impedance network 630. More particularly, signal currents traversing the winding 140 divide at the terminals of the anti-side-tone impedance network and follow the two paths, traced previously, whereby the well-known anti-side-tone effect is realized.

The release of the established communication connection is primarily under the control of the calling party. If the called party at the substation A restores his receiver to its hook before the calling key switch 100 is returned to normal, the established called party loop circuit extending to the repeating transformer 500 is interrupted, causing the back bridge relay R510 to restore in the usual manner. Upon restoring, the relay R510 interrupts, at RA511 and RC513, the above-traced circuit for energizing R540 and, at RA511 and RC 512, it completes a circuit for energizing R530, the latter circuit extending by way of RA527, RA541 and the winding of R530 to battery. Upon operating, the relay R530 completes, at RA531, a holding circuit for itself, this circuit extending from ground at RA555 by way of RA531 and the winding of R530 to battery. It is noted that the relay R530, although of the slow-to-operate type, operates to complete its holding circuit before the slow-to-release relay R540 restores to open the operating circuit for R530. At RA532, the relay R530, upon operating, opens a further point in the above-traced operating circuit for R540 and, in so doing, opens a further point in the circuit by way of which energizing current is delivered to the microphone 135. At RA534, the relay R530 applies ground by way of C470 to the two start conductors C407 and C408, thereby to reinitiate the operation of the tone apparatus and the ringing apparatus providing this apparatus is not already in operation. At RA533, the relay R530 completes an alternative path including C469 for impressing busy-tone voltage upon the input circuit of the signal amplifier tube 620, thereby to cause busy tone to be reproduced by the loud speaker 136. The busy-tone signal produced by operation of the loud speaker 136 indicates to the calling party that the key switch 100 has not been restored to normal.

The purpose of providing the relay R530, which operates in response to the release operation performed at the called substation, is that of positively preventing eavesdropping on the part of a subordinate, following the termination of a conversation between the subordinate and the calling executive. Thus, in the absence of this relay and its associated circuits, the called party at the substation A could, after hanging up, again remove his receiver from its hook to recomplete the talking connection, provided the operated key switch 100 was not restored to normal by the calling party. In this regard, it will be appreciated that the back bridge relay R510 would respond to the recompletion of the loop circuit to again complete the circuit for delivering energizing current to the transmitter 135. Obviously, with this connection reestablished, the subordinate could listen to any conversation being carried on in the office of the executive. With the arrangement illustrated, however, the relay R530, upon operating, is held operated independently of the back bridge relay R510 and, in its operated position, holds interrupted, at RA532, the above-traced path by way of which energizing current is delivered to the transmitter microphone 135. Thus, the channel for transmitting signal currents outgoing from the special substation to the called substation is rendered completely inactive and eavesdropping on the part of a subordinate is positively prevented.

As indicated above, the common control apparatus 415 is released in response to the restoration of the operated key switch 100 to its normal position. When this switch is returned to normal, the three operated coding relays R200, R210 and R220, and the start relay R450 are all caused to restore in the manner pointed out above. When the three enumerated coding relays restore, the above-traced holding circuit for R420 is interrupted, causing the last-named relay to restore and interrupt, at RA422 and RC424, the circuit over which R560 is being held energized. During the restoration of the relay R560, the contact springs RA563 and RC564 are moved into engagement before the loop circuit extending to the called substation is interrupted, providing the called party has not restored his receiver to its hook. When the enumerated springs are moved into engagement, the condenser 543 is connected through RA551 between the line conductors C339 and C335. This condenser absorbs the voltage transient which occurs when the talking loop is interrupted at RA561 following the restoration of R560 completely to normal and thus prevents the transient from being reproduced as an objectionable "click" by the receiver at the called substation. When R560 falls back, it interrupts, at RA565 and RC566, a point in the holding circuit for the ring cutoff relay R550, whereby the last-mentioned relay is caused to restore. The relay R560 also opens RA561 a point in the path connecting the condenser 543 between the link line conductors C335 and C339. Upon restoring, the relay R550 opens, at RA555, a point in the holding circuit for R530. If R530 is operated, it restores to interrupt, at RA533, a point in the above-mentioned alternative path for delivering busy-tone energy to the signal amplifier tube 620. At RA534, the relay R530 removes multiple ground from C470. Following the restoration of R530, the common control apparatus 415 is entirely released.

As indicated above, the substation apparatus 600 is normally connected and arranged to be used in communicating over connections established between the executive substation and one of the other substations on calls incoming to the executive substation. The special substation apparatus illustrated in Figs. 1 to 6, inclusive, is, however, so arranged that the auxiliary transmitting and receiving means comprising the microphone 135 and the loudspeaker 136 may, if desired, be used in lieu of the regular substation apparatus 600 to answer incoming calls. For example, if a call is initiated at the substation A and routed by way of the automatic switching equipment 320 and the line 323 to the substation apparatus 600 at a time when the line 423 is idle, ringing current is projected over the line to actuate the ringing device conventionally included in the apparatus 600, thereby to give an audible indication that the executive substation is being called. Obviously, the call may be answered in the usual manner by removing the receiver embodied in the substation apparatus 600 from its associated hook. Alternatively, the auxiliary transmitting and receiving means comprising the loudspeaker 136 and the transmitter microphone 135 may be used. In case the answering party elects to use the last-mentioned means, the answer switch 111 is operated to its off-normal position to close the springs 125 and thereby complete a circuit for energizing the control relay R520. The circuit noted extends from the grounded conductor C127 by way of the springs 125, the springs 124, C152, and the winding of R520 to battery. At the springs 125, a circuit is also completed for energizing the signal lamp 126 in series with the winding of R270, this circuit extending from the grounded conductor C127 by way of the springs 125, the signal lamp 126, C127' and the winding of R270 to battery. When energized over the above-traced circuit, the relay R270 operates and the signal lamp 126 is illuminated to indicate that the answer switch 111 occupies its off-normal position. The relay R270, upon operating, completes, at RA272, a path for applying ground to the amplifier start conductor C294, whereby the signal amplifier comprising the vacuum tube 620 is conditioned for operation in the manner described previously. At RA 271, the relay R270 completes a direct current bridging path between the line conductors C327 and C328 of the called line 323, which path includes the two windings 303 and 304 of the repeating transformer 300. More particularly, the bridging path noted extends from the line conductor C327 by way of the windings 304, the resistor 306, C298, RA271, C299 and the winding 303 to the opposite line conductor C328. The operated connector switch by way of which the connection is routed to the line 323 responds to the completion of this path in the usual manner by interrupting the ringing operation.

As indicated above, the relay R520 is energized in response to the operation of the answer switch 111 to its off-normal position. When energized, this relay operates to complete, at RA528', the above-traced circuit for energizing R540 and by way of which energizing current is delivered to the transmitter microphone 135. At RA527, the relay R520 opens a point in the above-traced operating circuit for R530, thereby to prevent the last-mentioned relay from operating in response to the operation of R540. At RA524 and RA528 and their respective associated resting contacts RC525 and RC529', the relay R520 disconnects the line conductors C575 and C576 from the winding 501 of the repeating coil 500, and, at these same armatures and their respective associated working contacts RC526 and RC529, connects the line conductors C575 and C576 by way of the link line conductors C296 and C297, respectively, to the opposite terminals of the repeating transformer winding 301. Thus, the repeating transformer 300 is incorporated in the newly established talking connection in lieu of the repeating transformer 500, which latter transformer is used on subordinate calls originated at the special substation. Since the impedance characteristics of the loop circuits respectively including the repeating transformers 500 and 300 may be different, it is desirable to provide alternative line balancing circuits arranged alternatively to be included in the anti-side-tone impedance network 630. As described above, with the relay R520 deenergized, the line balancing circuit comprising the inductance element 631 and the resistor 632 is operatively included in the anti-side-tone impedance network 630. When, however, the relay R520 operates, it substitutes the other balancing circuit, namely, that comprising the inductance element 631' and the resistor 632', for the first-mentioned balancing circuit in the anti-side-tone impedance network. This is accomplished through the operation of R520 to disconnect, at RA521, the conductor C574, extending to the upper terminal of the winding 613, from the conductor C572 and to connect this conductor to the conductor C573. It will be understood that the line balancing circuit comprising the inductance element 631' and the resistor 632' is adjusted to have a frequency-impedance characteristic substantially matching that of the equivalent impedance of the repeating transformer 300 and the line impedances associated therewith as determined at the line terminals 643 and 644 of the impedance network 630. Similarly, the line balancing circuit comprising the inductance element 631 and the resistor 632 is adjusted to have a frequency-impedance characteristic substantially the same as that of the equivalent impedance of the repeating transformer 500 and the line impedances associated therewith as determined at the line terminals 643 and 644 of the network 630.

Following the operation of R520, the desired conversational connection is fully completed. After the connection is completed the answering party may, by removing the telephone receiver or hand set of the substation apparatus 600 from its supporting hook or cradle and restoring the operated answer switch 111 to normal, release the auxiliary transmitting and receiving means comprising the loudspeaker 136 and the transmitter 135 and continue the conversation by using the regular substation transmitter and receiver. Also, by restoring and removing the substation hand set from its supporting hook and operating the answer switch 111 between its normal and off-normal positions, the answering party may substitute one set of apparatus for the other as many times as desired during a single conversation. In any case, when the answer switch 111 is restored to normal, the above-traced operating circuit for the relay R520 is interrupted to cause this relay and the relay R540 to restore in the order named, and the series circuit for energizing the signal lamp 126 and the relay R270 is interrupted causing the last-mentioned relay to restore. When R270 restores, it removes ground from the amplifier start conductor C294, thereby to render the signal amplifier inactive, and opens, at RA271, a point in the above-traced bridging path between the conductors C327 and C328 of the line 323. Following the restoration of the three relays R520, R540 and R270, the auxiliary transmitting and receiving means are entirely disconnected from the line 323.

As pointed out previously, to initiate a call at the special substation intended for a substation connected to a line not directly accessible to the special switching means, it is necessary to employ the dial operated calling device conventionally included in the substation apparatus 600. Such a call is initiated in the usual manner by removing the hand set embodied in the apparatus 600 from its supporting cradle to cause a bridging path to be placed across the line conductors C327 and C328 of the line 323. As a result of the completion of this path, one of the non-numerical switches included in the switching equipment 320 responds by extending the calling loop circuit through to one of the numerical impulse responsive switches of the exchange, whereby the seized switch is conditioned to respond to impulses transmitted thereto by way of the calling line 323. The seized impulse responsive switch and one or more additional impulse responsive switches successively respond to the impulses of successive digits dialed at the calling substation by extending the connection to the called line 321 in the usual manner. If, following the dialing operation, the selected called line is found busy, busy tone is returned over the calling loop and is reproduced by the receiver included in the apparatus 600 to give an audible indication that the desired connection can not be obtained. On the other hand, if the selected called line is idle, ringing current is projected thereover to actuate the signal device at the called substation and ring-back tone is conducted back over the calling loop circuit to indicate to the calling party that the called substation is being rung. When the call is answered at the called substation, the desired conversational connection is completed in the usual manner.

Following the completion of a connection to the substation B in the manner just described, the auxiliary transmitting and receiving means comprising the transmitter microphone 135 and loud speaker 136 may be substituted for the transmitter and receiver embodied in the hand set for use in transmitting and reproducing signal currents. Such substitution is accomplished in the exact manner pointed out above with respect to the calls incoming to the executive substation, that is, by operation of the answer switch 111 to its off-normal position to cause the operation of the relay R270 and the two relays R520 and R540 embodied in the common control apparatus 415. The three relays noted operate in the exact sequence and perform the same functions as are described in detail in a preceding portion of the specification, both during the substitution and during the release of the apparatus following the restoration of the answer switch 111 to normal. Here again, it will be appreciated that the regular substation transmitter and receiver may be substituted at will for the transmitting microphone 135 and the loud speaker 136 by operating the answer switch 111 and restoring or removing the hand set from its supporting hook in the proper order.

As indicated in the introductory portion of the specification, a calling party at the executive substation may utilize the special substation apparatus to initiate a direct call to one of the subordinate lines during the course of a conversation over an established connection to another of the lines extending to the exchange housing the automatic switching equipment 320. If the ensuing conversation is being held over a connection utilizing the regular substation transmitter and receiver embodied in the substation apparatus 600, the second call to the subordinate line may be initiated in the exact manner described above. For example, if the calling party is using the regular substation apparatus 600 to converse over an established connection extending to the substation B and desires to secure information from the subordinate having an office in which the substation A is located, the direct call to the substation A is initiated by operating the calling switch 100 to the lower off-normal position in the manner described above. The coding relays R200, R210 and R220, the common equipment 415 and the rotary switch 310 respond to the operation of the switch 100 to its off-normay position by performing the previously described functions, whereby a talking connection including the loud speaker 136 and the transmitter microphone 135 is established between the executive substation and the substation A. This direct connection may be released in the manner set forth above.

If the loud speaker 136 and the transmitter 135 are being used as the receiving and transmitting means in an established connection extending to the substation B and it is desired to use the special substation apparatus to initiate a call to one of the subordinate lines, as, for example, the line 322, directly accessible to the special substation equipment, it is necessary to operate the calling switch 100 to the off-normal position corresponding to the line 322 and following this, to operate the transfer switch 110 to its off-normal position. When the calling switch 100 is operated to the off-normal position corresponding to the line 322, the apparatus illustrated in Figs. 2, 3, 4 and 5 operates to cause a connection to be extended to the line 322 in the exact manner described above. In this regard it will be recalled that the three relays R270, R520 and R540 are operated. Hence, the amplifier comprising the vacuum tube 620 is conditioned for operation and the line conductors C575 and C576 incoming to the anti-side-tone impedance network 630 are connected through to the repeating coil 300. The operated condition of the three relays R270, R520 and R540 in no way interferes with the operation of the other relays included in the common control apparatus 415 to cause the connection to the desired subordinate line 322 to be established. When the transfer switch 110 is operated to its off-normal position, following operation of the calling switch 100 to the off-normal position corresponding to the called subordinate line 322, the operating circuit for the relay R520 is interrupted at the springs 124, causing this relay to restore. When the relay R520 falls back, it disconnects the line conductors C575 and C576 from across the terminals of the transformer winding 301 and connects these line conductors to the respective terminals of the transformer winding 501, thereby operatively to include the auxiliary transmitting and receiving means comprising the loud speaker 136 and the transmitter microphone 135 in the established connection extending to the called subordinate line 322. The relay R520, upon restoring, also disconnects the conductor C574 from the conductor C573 and connects it to the conductor C572, thus substituting the line balancing circuit comprising the inductance element 631 and the resistor 632 for the balancing circuit comprising the inductance element 631′ and the resistor 632′ in the anti-side-tone impedance network 630. With the relay R520 in its restored position, the original circuit for supplying energizing current to the microphone 135 and for holding R540 operated, is interrupted at RA528′. At this time, however, the back bridge relay R510 is in its operated position so that a multiple circuit extending from ground at RA511 and by way of RC513 and RA532 is completed for maintaining R540 operated and for supplying energizing current to the microphone 135.

It will be noted that to effect the transfer operation just described the transfer switch 110 is operated to its off-normal position without restoring the answer switch 111 to its normal position. So long as the last-mentioned switch is retained in its off-normal position, the above-traced circuit by way of which the relay R210 is energized is held completed and, so long as R270 is energized and remains in its operated position, the loop circuit extending to the substation B and including the line 322 is maintained completed at RA271. After the two connections extending, respectively, to the substations A and B are established, the party at the executive substation may, by operating the transfer key between its normal and off-normal positions, converse over either of the two connections at will. Thus, if the party at the executive substation, after conversing with the called party at the substation A, desires to again converse with the party at the substation B, he may do so by returning the transfer switch 110 to its normal position to recomplete the above-traced operating circuit for R520. It will be apparent, in view of the foregoing description, that when R520 reoperates it substitutes the balancing circuit comprising the inductance element 631' and the resistor 632' for the balancing circuit 631, 632 in the anti-side-tone impedance network, disconnects the line conductors C575 and C576 from the transformer winding 501, and reconnects the line conductors C575 and C576 to the terminals of the repeating transformer winding 301.

In order to release the two established connections, it is only necessary to restore the operated switches 100 and 111 to normal. When the switch 100 is returned to its normal position, the three operated coding relays R200, R210 and R220 are caused to restore, together with the start relay R450. Following the restoration of these four relays, the remaining operated relays embodied in the common control apparatus 415 are caused sequentially to restore in the manner described in detail in a preceding portion of the specification. Also, when the answer switch 111 is returned to its normal position, the three operated relays R520, R540 and R270 are deenergized and restore in the manner described previously.

From the foregoing description it will be apparent that, if a party at the executive substation is conversing over an established connection routed by way of the switch 310 and desires information from another party having a line terminating at the exchange housing the switching equipment 320, he may initiate a call to the substation of the second party without interfering with the already established connection by using the regular substation apparatus 600. The second call is forwarded to the desired substation by dialing the directory number of the called substation and through operation of the automatic switching equipment 320 in the exact manner described above. After the second connection is established, it will be apparent that the calling party at the executive substation may, by first operating the answer switch 111 to its off-normal position and then operating the transfer switch 110 from its normal position to its off-normal position and vice versa, cause the auxiliary transmitting and receiving means including the transmitter microphone 135 and the loud speaker 136 operatively to be included in either of the two established connections without releasing either connection.

With the apparatus illustrated in Figs. 1 to 6, inclusive, and described above, no provision is made for operatively including the telephone transmitter and receiver embodied in the substation apparatus 600 in a connection which has been established in response to operation of one of the calling key switches shown in Fig. 1. Hence, on a direct line call, or a call resulting in a connection completed in response to operation of one of the calling switches, it is impossible for the calling party at the executive substation to maintain any secrecy with respect to the conversation held over the established connection. This is true for the reason that, with the arrangement described, the loud speaker 136 and the transmitter microphone 135 can only be used as the transmitting and receiving means in this type of connection.

In order to permit either of the two sets of transmitting and receiving means selectively to be connected for use in communicating over either of the two types of connections, the improved arrangement shown in Fig. $6_a$ may be used in lieu of the apparatus shown in Fig. 6. More particularly, the apparatus shown in Fig. $6_a$ is so arranged that the transmitter and receiver embodied in the substation apparatus 600 may be operatively included in a direct call connection established as a consequence of operation of one of the calling switches shown in Fig. 1. In general, the arrangement of the apparatus illustrated in Fig. $6_a$ is substantially similar to that shown in Fig. 6 and, accordingly, corresponding elements of the two figures have been identified by the same reference characters. For the purpose of substituting the transmitter and receiver embodied in the substation apparatus 600 for the transmitter microphone 135 and the loud speaker 136 in an established direct call connection, there is provided a key switch 655 of the locking type which includes contact springs 656 to 669, inclusive, wired in the manner shown. More particularly, the line conductors C327 and C328 of the substation line 323 are connected, respectively, to the springs 662 and 665 so that, when the switch 655 occupies its normal position, they are connected through to the substation apparatus 600. When, however, the key switch 655 is operated to its off-normal position, the two springs 663 and 666 are transferred from engagement with the springs 662 and 665, respectively, and into engagement with the springs 664 and 667, respectively, whereby the substation apparatus 600 is connected across the secondary winding 652 of a coupling transformer 650. The transformer 650 corresponds to the coupling transformer 137 associated with the closed transmission circuit including the microphone 135. The primary winding 651 of the transformer 650 is arranged to be connected across the opposite terminals of the anti-side-tone impedance network 630 in lieu of the winding 140 of the transformer 137 when the switch 655 is operated to its off-normal position. The switch 655 also includes contact springs for disconnecting the current feed conductor C570 from the transmission circuit including the microphone 135 and for connecting this conductor to supply energizing current to the transmitter included in the telephone substation apparatus 600. More particularly, with the switch 655 in its normal position, the conductor C570 is connected by way of the springs 657 and 658 to the conductor C151, whereby energizing current may be supplied to the transmitter microphone 135 over the circuit traced previously. When, however, the switch 655 is operated to its off-normal position, the spring 657 is moved from engagement with the spring 658 to open a point in the previously traced circuit, and is moved into engagement with the spring 656 to complete a circuit, traced hereinafter, for supplying energizing current to the transmitter embodied in the apparatus 600. For the purpose of rendering the loud speaker 136 completely inoperative to reproduce signal currents incoming to the executive substation at a time when the switch 655 is operated to its off-normal position, this switch is provided with a pair of springs 668 and 669 which are operative to short-circuit the secondary winding 629 of the amplifier output coupling transformer 627.

Figure 6A:
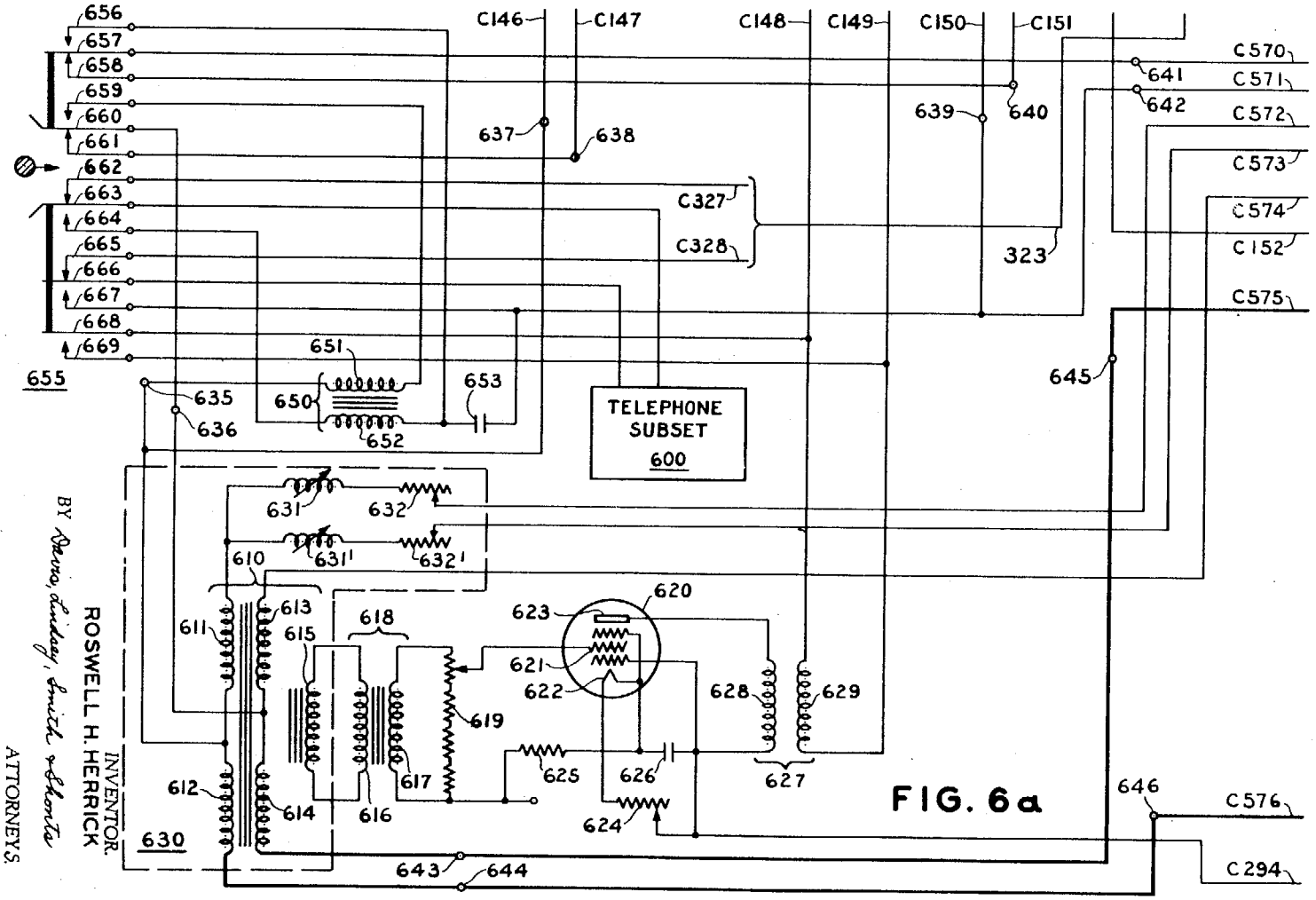

To incorporate the switch 655 and the transformer 650, as shown in Fig. 6a, in the circuit of Fig. 6, the terminal 642 is connected to the spring 667; the strap between the terminals 640 and 641 is broken and these two terminals are respectively connected to the springs 658 and 657; the terminal 635 is connected to one terminal of the transformer winding 651; and the strap between the terminals 636 and 638 is broken to permit these two terminals to be wired, respectively, to the springs 660 and 661. Also, the line conductors C327 and C328 are terminated at the springs 662 and 665, respectively, and the line conductors of the cord extending to the substation apparatus 600 are terminated at the springs 663 and 666, respectively, in the manner pointed out above.

The inclusion of the switch 655 and the coupling transformer 650, shown in Fig. 6a, in the circuit of Fig. 6 in no way affects the operation of the apparatus described above to set up the various types of connections previously described or the operation of the apparatus to transfer the auxiliary transmitting and receiving elements 135 and 136, respectively, from a connection extending to one of the directly accessible subordinate lines to a connection with the line 323 or vice versa. Thus, so long as the switch 655 is retained in its normal position, the line conductor C327 of the line 232 is connected by way of the springs 662 and 663 to one of the line conductors of the cord extending to the apparatus 600, and the line conductor C328 of the line 323 is connected by way of the springs 665 and 666 to the opposite line conductor of the cord extending to the apparatus 600. Also, with the switch 655 in this position, the conductor C146 is connected directly to one terminal of the anti-side-tone impedance network 630 and the other conductor C147 is connected to the opposite terminal of the anti-side-tone impedance network over a path including the terminal 638, the two springs 661 and 660, and the terminal 636. With the switch 655 in its normal position, energizing current is supplied to the transmitter 135 over a circuit extending from ground at RA511 or RA528′ by way of C571, the terminals 642 and 639, C150, the transmitter 135, the winding 138, C151, the terminal 640, the springs 658 and 657, the terminal 641, C570 and through the winding of R540 to battery. Thus, so long as the switch 655 is retained in its normal position, the circuit arrangement of the apparatus illustrated in Fig. 6a is the same as the arrangement shown in Fig. 6 and all of the various operations described above may be carried out in the exact manner previously described.

If, with the Fig. 6a arrangement incorporated in the system, a direct call connection is established between the executive substation and one of the subordinate lines, as, for example, the line 322, directly accessible thereto, and it is desired to use the telephone transmitter and receiver embodied in the apparatus 600 in communicating over the established connection, the switch 655 is thrown to its off-normal position. When the switch 655 is operated to its off-normal position, the above-traced path for conducting energizing current to the transmitter microphone 135 is interrupted at the springs 657 and 658. Also, the winding 140 of the transformer 137′ is disconnected from across the terminals of the anti-side-tone impedance network 630 at the springs 660 and 661. At the springs 658 and 660, the winding 651 of the coupling transformer 650 is connected across the terminals of the anti-side-tone impedance network. At the springs 663 and 666 and their respective associated springs 662 and 665, the line conductors of the cord extending to the substation apparatus are disconnected from the conductors C327 and C328, respectively, of the line 323. At the springs 663 and 666 and their respective associated springs 664 and 667, the line conductors of this cord are connected across the winding 652 of the coupling transformer 650 in series with the condenser 653. At the springs 656 and 657, a circuit is completed for supplying energizing current to the transmitter embodied in the substation apparatus 600, which circuit may be traced as extending from ground at RA511 or RA528′, by way of C571, the springs 667 and 666, one line conductor of the cord extending to the apparatus 600, the transmitter embodied in this apparatus, the other line conductor of the cord, the springs 663 and 664, the transformer winding 652, the springs 656 and 657, C570 and through the winding of R540 to battery. At the springs 668 and 669, an obvious path is completed for short-circuiting the secondary winding 629 of the transformer 627, thereby to render the loud speaker 136 completely inactive by positively preventing signal frequency energy incoming to the executive substation from being delivered to the loud speaker.

Following the operation of the switch 655 to its off-normal position the path of signaling currents incoming to the substation apparatus may be partially traced as extending by way of the line conductor C575, the winding 614, the springs 660 and 659, the transformer winding 651, and the winding 612 back to the opposite line conductor C576. Portions of the signaling currents are by-passed through the two windings 613 and 611 and the balancing network connected between the upper terminals thereof. Signaling currents traversing the winding 651 cause corresponding induced voltages to be developed in the winding 652. Corresponding currents are caused to flow over the closed circuit including the winding 652, the springs 664 and 663, the receiver embodied in the apparatus 600, the springs 666 and 667 and the coupling condenser 653. These currents are reproduced by the receiver forming a part of the apparatus 600 in the usual manner. Signal currents developed by operation of the transmitter embodied in the apparatus 600 circulate in the closed circuit, just traced, and cause corresponding induced voltages to be developed in the winding 651 of the tranformer 650, which voltages are impressed across the terminals of the anti-side-tone impedance network 630 and are delivered through this network to the loop extending to the distant substation. It will be apparent that, by restoring the switch 655 to normal, the substation apparatus 600 is disconnected from the established connection and the original circuit connections are reestablished, whereby incoming signal currents are delivered to and reproduced by the loud speaker 136, and the microphone 135 is operatively included in the path for transmitting signal currents from the substation. After the switch 658 has been operated to its off-normal position operatively to connect the apparatus 600 to the link line conductors C575 and C576, this apparatus may selectively be connected to be used in communicating over a connection routed by way of the link line C335, C339 or a connection routed by way of the link line C296, C297, by operating the answer switch 111 to its off-normal position and then operating the transfer switch 110 between its two positions to control the transfer relay R520. It will further be apparent that the inclusion of the switch 655 and the coupling transformer 650 in the circuit of Fig. 6a in no way interferes with the release of an established regular connection or an established direct call connection. The manner in which such connections are released is described previously.

Figure 6B:
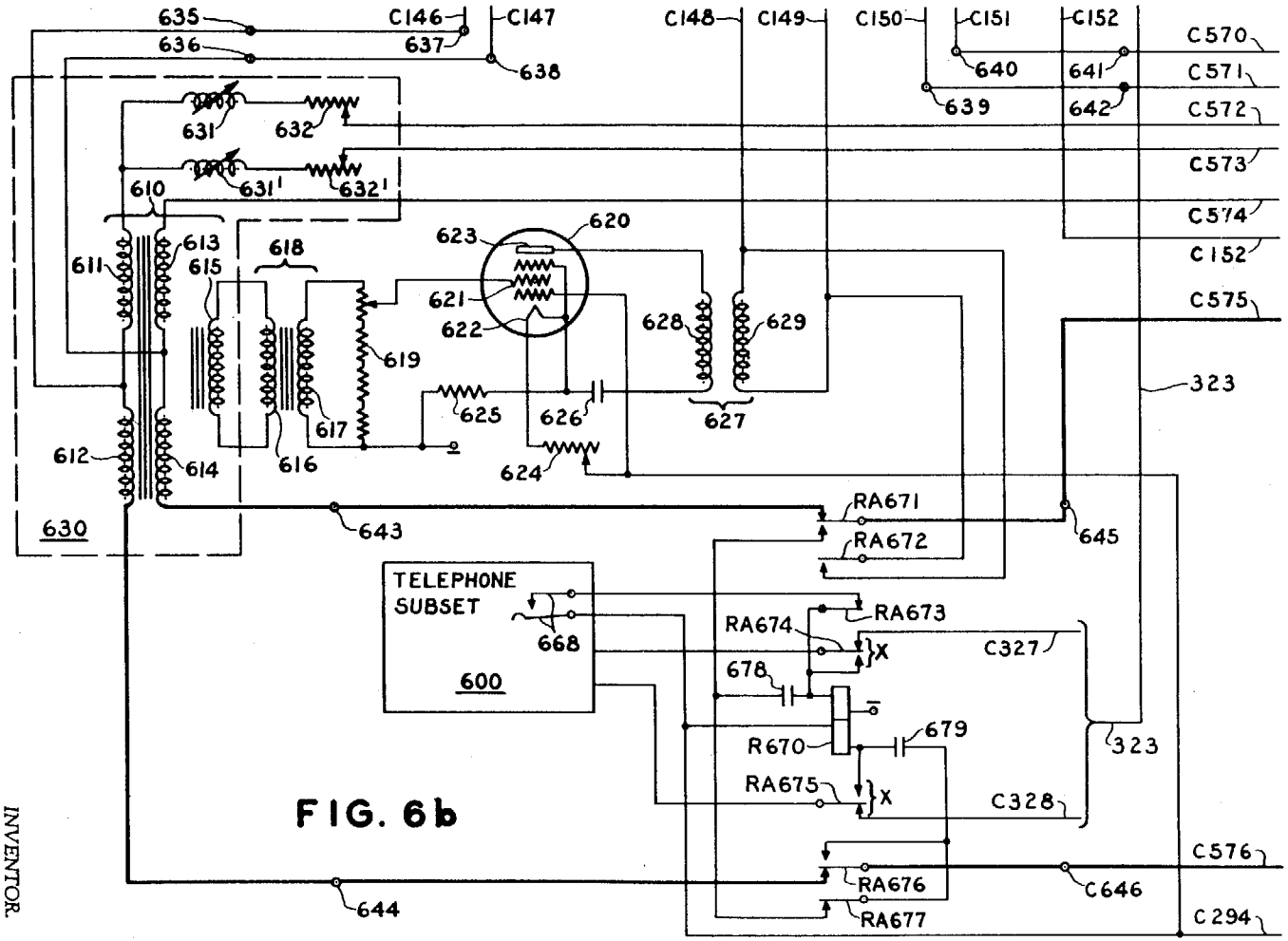

Referring now more particularly to Fig. 6b, there is illustrated a modification of the circuit apparatus of Fig. 6, wherein means are provided for rendering the inclusion of the regular substation transmitter and receiver in an established direct call connection under the control of the hook or cradle switch conventionally included in the regular substation apparatus. The arrangement is such that, when the transmitter and receiver hand set is being supported upon its hook or cradle, the loud speaker 136 and the microphone 135 are utilized as the transmitting and receiving means, respectively, and, when the substation hand set is removed from its supporting hook or cradle, the transmitter and receiver embodied therein are substituted for the elements 136 and 135 as the receiving and transmitting means to be used. In general, the apparatus shown in Fig. 6b is the same as that shown in Fig. 6 and corresponding elements are identified by the same reference characters. The modification of the Fig. 6 circuit arrangement to realize the preferred Fig. 6b arrangement consists in the provision of a switching relay R670 and in equipping the hook or cradle switch embodied in the apparatus 600 with an extra set of springs 668 which are arranged to be closed when the hand set of the apparatus is removed from its supporting hook or cradle. The circuit of Fig. 6 is modified to include the relay R670 by opening the straps between the terminals 643 and 645 and between the terminals 644 and 646 and by connecting the respective terminals to certain of the armature controlled contact springs of the relay R670 in the manner illustrated. Also, the upper terminal of the lower winding of R670 is connected to the amplifier start conductor C294, whereby the operating circuit, traced hereinafter, for this relay is prepared when the signal amplifier is conditioned for operation. For the purpose of preventing the local substation circuit from howling due to the unbalance of the couplings between the loud speaker 136 and the signal amplifier, all when the relay R670 is operated, this relay is provided with a pair of contact springs associated with RA672 for short-circuiting the input circuit to the loud speaker 136 during the intervals when the relay R670 is operated.

Considering the operation of the apparatus shown in Fig. 6b, when the hand set embodied in the apparatus 600 is resting upon its supporting cradle or hook, the springs 668 are open and the operating circuit, traced hereinafter, for R670 is held interrupted, whereby the line conductors C575 and C576 are connected by way of the armatures RA671 and RA676 and their respective associated resting contacts through to the line terminals 643 and 644 of the network 630. Thus, the altered circuit arrangement and the inclusion of the relay R670 in no way affect the operation of the apparatus to establish a connection on a direct call to a subordinate line. In this connection, it is pointed out that the springs 668 retain the operating circuit for R670 open so long as the substation hand set is retained on its supporting hook or cradle.

With the hand set resting on its supporting means such that the relay R670 is restored, the two line conductors C327 and C328 of the substation line 323 are connected by way of the armatures RA674 and RA675 and their respective associated resting contacts to the line conductors of the cord extending to the substation apparatus 600. So long as all of the calling switches and the answer key switch 111 occupy their respective normal positions, the amplifier start conductor C294 is disconnected from ground so that the operating circuit, traced hereinafter, for R670 is interrupted independently of the hook or cradle switch spring 668. Hence, when no direct call connection is established, the substation apparatus 600 may be utilized in the usual manner in the initiation and answering of calls outgoing from and incoming to the executive substation.

If, while the hand set embodied in the apparatus 600 is resting upon its supporting cradle or hook, a direct call is initiated to one of the subordinate lines and a connection between the special substation equipment and the called subordinate substation is established, the transmitter 135 and the loud speaker 136 are utilized as the signal current transmitting and receiving means in the manner pointed out above. Assuming that such a connection is established and, further, that it is desired to use the hand set embodied in the apparatus 600 as the transmitting and receiving means in communicating over the direct call connection, the hand set is removed from its supporting hook or cradle, thereby to cause the springs 668 to be moved into engagement and to connect a direct current bridge between the line conductors of the cord extending to the apparatus 600. When the springs 668 are closed, the above-mentioned circuit is completed for energizing R670, this circuit extending from the grounded amplifier start conductor C294 by way of the springs 668, RA673 and the upper winding of R670 to battery. The armature springs of the relay R670 are so adjusted that the two armatures RA674 and RA675 are moved from engagement with their respective associated resting contacts and into engagement with their respective associated working contacts before the armature RA673 is moved from engagement with its associated resting contact. Thus, upon the initial energization of the upper winding of R670, a holding circuit is completed for this relay before the operating circuit, traced above, is interrupted. This holding circuit extends from the grounded conductor C294 by way of the lower winding of R670, RA675 and its associated working contact, the closed bridge between the line conductors of the cord extending to the apparatus 600, RA674 and its associated working contact, and the upper winding of R670 to battery. Energizing current is delivered to the transmitter embodied in the hand set of the apparatus 600 over this holding circuit for the relay R670. Immediately after the completion of the above-traced holding circuit, the armature RA673 is moved from engagement with its associated resting contact to interrupt the operating circuit for R670.

At RA671 and RA676 and their respective associated resting contacts, the relay R670, upon fully operating, disconnects the line conductors C575 and C576 from the line terminals 643 and 644, respectively, of the anti-side-tone impedance network 630 and connects these line conductors by way of the condensers 678 and 679, respectively, to the line conductors of the cord extending to the substation apparatus 600. Thus, the transmitter and receiver incorporated in the substation apparatus 600 are substituted for the auxiliary transmitting and receiving means in the established connection.

When the operating circuit for R670 is completed, a relatively heavy current flows through the upper winding of the relay, which current is materially reduced when the operating circuit is broken and the holding circuit for R670 is completed. Due to the collapse of the magnetic field occasioned by interruption of the operating circuit, a relatively large transient voltage tends to be developed across the windings of R670, which if not absorbed, would be impressed through the condensers 678 and 679 across the repeating transformer winding 501 or the winding 301, depending upon the position of the relay R520. If allowed to assume its full value such a transient would cause an objectionable click in the receiver being used at the distant end of the connection. To obviate this difficulty the relay R670 is provided with a set of armature springs associated with RA677 which are included in an obvious path for short-circuiting the signal channel comprising the two line conductors C575 and C576 during the initial operation of R670. The springs of this set are so arranged that they are not moved to the open-circuit position to interrupt the short-circuiting path noted until after the transient is substantially damped out. By this arrangement the transient voltage is not impressed on the signal channel of which the line conductors C575 and C576 form a part, but is dissipated in a closed circuit comprising the condensers 678 and 679, the two windings of R670, the exchange battery and RA677.

It will be noted that, when the relay R670 operates to connect the substation apparatus 600 to be used in communicating over the established connection, the line terminals 643 and 644 of the anti-side-tone impedance network 630 are open-circuited and, thus, this network is unbalanced so that electrical coupling is incidentally provided between the signal current receiving and signal current transmission paths extending to the loud speaker 136 and from the microphone 135, respectively. Also, acoustical coupling exists between the microphone 135 and the loud speaker 136, and the signal amplifier comprising the vacuum tube 620 is still energized and in condition for operation. Due to the two couplings noted, a local oscillatory condition tends to be set up in the network comprising the signal amplifier, the transmitter 135, the loud speaker 136, and the anti-side-tone impedance network. If this oscillatory condition is allowed to persist, howling or singing results. To obviate this difficulty, the relay R670 is provided with a pair of armature springs for short-circuiting the input circuit to the loud speaker 136 when this relay occupies its operated position. More particularly, when the relay R670 operates, it completes, at RA672, an obvious path for short-circuiting the winding 629 of the transformer 627, thereby effectively to interrupt the local oscillatory circuit, as described above, and to prevent howling during the intervals when the auxiliary transmitting and receiving means are conditioned for operation but are disconnected from an established communication connection.

The auxiliary transmitting and receiving means may be substituted for the transmitter and receiver embodied in the substation apparatus 600 by returning the substation hand set to its supporting hook or cradle, thereby to open the direct current bridge across the line conductors of the cord extending to this apparatus and to open the springs 668. When the springs 668 are opened, the above-traced operating circuit for R670 is interrupted and, when the direct current bridge between the line conductors of the cord extending to the apparatus 600 is interrupted, the above-traced holding circuit for R670 is opened. Thus, the relay R670 is caused to restore to disconnect the substation apparatus 600 from the established communication connection; to interrupt, at RA672, the short-circuiting path across the winding 629; and to reconnect the line conductors C575 and C576 to the line terminals 643 and 644, respectively, of the anti-side-tone impedance network 630.

From the foregoing description, it will be apparent that, when once the relay R670 is operated, it is only deenergized in response to the replacement of the substation hand set upon its supporting hook or cradle. Hence, to release a direct call connection which has been established in the manner previously described and to which the apparatus 600 is operatively connected, it is necessary to restore the operated one of the calling switches of Fig. 1 to normal and to replace the substation hand set upon its supporting hook or cradle. When the operated calling switch is returned to its normal position, the operated relays of Figs. 2, 4 and 5 are caused to restore in the manner described previously, it being noted that, when the start relay R450 falls back, ground is removed from the amplifier start conductor C294 to open a point in the operating circuit for the relay R670. When the substation hand set is placed upon its supporting hook or cradle, the operating and holding circuits for R670 are interrupted in the manner just described.

It is possible, with the apparatus shown in Fig. 6b incorporated in the system, to initiate a direct call, by operation of one of the calling switches of Fig. 1, at a time when a connection routed by way of the automatic switching equipment 320 is established between the executive substation and one of the other subscribers' substations. If, for example, the apparatus 600 is connected by way of the line 323, certain of the automatic switching apparatus included in the equipment 320, and the line 321 to the substation B and the party at the executive substation desires information from the subordinate located at the substation A, he first operates the answer switch 111 to its off-normal position to complete the above-traced circuits for energizing R270 and R520. Under these conditions, it will be appreciated that the substation hand set embodied in the apparatus 600 is removed from its receiver so that the operating circuit for the relay R670 is prepared at the springs 668. When, therefore, the relay R270 operates to apply ground, at RA272, to the amplifier start conductor C294, the above-traced operating circuit for R670 is completed, causing this relay to operate to complete its holding circuit, as traced previously. The relay R270, upon operating, also completes, at RA271, the above-traced direct current path between the line conductors C327 and C328 of the line 323. When the relay R520 operates, it functions to complete the above-traced circuit for energizing R540 and for supplying energizing current to the transmitter microphone 135. In addition, the relay R520 disconnects the line conductors C575 and C576 from the winding 501 of the repeating transformer 500 and connects these line conductors by way of the two line conductors C296 and C297 to opposite terminals of the repeating transformer winding 301. When the relay R670 operates in response to the operation of R270, it connects the line conductors of the cord incoming to the apparatus 600 by way of the condensers 670 and 679, RA674 and RA675, and RA671 and RA676 to the line conductors C575 and C576. Thus, through the operation of the three relays R270, R520 and R670, a substitute talking connection is provided between the apparatus 600 and the substation B, which substitute connection includes the repeating transformer 300 and the two link line conductors C296 and C297.

When the relay R270 operates, it not only completes the operating circuit for R670 in the manner described above, but, in addition, applies cathode and anode voltages to the signal amplifier tube 620, thereby conditioning the signal amplifier for operation.

Following the operation of the answer switch 111 to its off-normal position to cause the relay operations just described, the calling switch 100, corresponding to the subordinate line 322 leading to the desired substation A, is operated to the lower off-normal position corresponding to this line, whereby the four relays R200, R210, R220 and R450 are caused to operate in the manner pointed out above. The operation of the rotary switch 310 and the common control apparatus 415 to select the called line 322 in the manner previously described in thus initiated. When the called line 322 is selected, it is tested to determine the idle or busy condition thereof and, if busy, the busy relay R410 operates to complete the above-traced circuit for conducting busy tone current through the winding 501 of the repeating transformer 500 and also to impress the above-described background signal on the previously established connection in which the line 322 is involved. On the other hand, if the line 322 is idle at the time it is selected and tested, the two relays R400 and R560 are caused to operate to project ringing current over the selected called line. When the call is answered at the called substation, the ring cutoff relay and the back bridge relay R550 and R510, respectively, both operate so that a loop circuit is completed between the repeating transformer 500 and the called substation A. This loop circuit is maintained completed so long as the calling switch 100 is retained in the off-normal position corresponding to the called line 322.

After the calling switch 100 is operated to its off-normal position to cause the sequence of operations just described, the calling party, in order to complete the connection to the called subordinate substation, operates the transfer switch 110 to its off-normal position. In response to the operation of the switch 110 to the off-normal position, the previously traced operating circuit for the transfer relay R520 is interrupted at the springs 124, causing this relay to restore. When the relay R520 falls back, it disconnects the line conductors C575 and C576 from the line conductors C296 and C297 of the link line extending to the repeating transformer 300 and connects the first-enumerated line conductors to the terminals of the repeating transformer winding 501, thus completing a communication connection between the substation apparatus 600 and the called subordinate substation A. Obviously, if the transfer switch 110 is operated to its off-normal position before the call is answered at the substation A, or the substation A is busy at the time it is called, ring-back tone or busy tone will be delivered over the partially completed talking connection to the receiver embodied in the apparatus 600 to indicate to the calling party the progress of the call. On the other hand, if the call to the substation A is answered before the key switch is operated to its off-normal position, the desired conversational connection is fully completed in response to the last-mentioned operation and conversation may be held thereover. Obviously, to transfer the substation apparatus 600 from a connection with the established connection extending to the substation A to the connection extending to the substation B or vice versa. It is only necessary to actuate the transfer switch 110 between its two operating positions.

After the two connections extending, respectively, to the subordinate line 322 and to the regular automatic substation line 321 are completed in the manner just described, the auxiliary transmitting and receiving means may be operatively associated with either connection to be used as the transmitting and receiving means in lieu of the hand set embodied in the apparatus 600. Thus, if the party at the executive substation is using the hand set embodied in the apparatus 600 to converse over the established connection extending to the subordinate substation A and desires to use the microphone 135 and the loud speaker 136 rather than the hand set, he may initiate the transfer by restoring the hand set to its supporting cradle or hook, thereby to interrupt the operating and holding circuits for R670 in the manner previously described. When R670 restores, it disconnects the line conductors C575 and C576 from the line conductors of the cord extending to the apparatus 600 and connects the first-mentioned line conductors to the line terminals 643 and 644, respectively, of the anti-side-tone impedance network 630, whereby the substitution of the auxiliary substation transmitting and receiving means is fully effected. Following this operation, if the party at the executive substation desires to utilize the microphone 135 and the loud speaker 136 in conversing over the established connection to the substation B, rather than the substation A, he may do so by returning the transfer switch 110 to its normal position, thereby to cause the operation of R520. When R520 operates, the two line conductors C575 and C576 are disconnected from the repeating transformer winding 501 and connected by way of the link line conductors C296 and C297 to the terminals of the repeating transformer winding 301, thus effecting the desired transfer to the connection extending to the substation B.

In order to release the two established connections and to restore the substation apparatus located at the executive substation to normal, it is necessary to return the operated calling switch 100 and the answer switch 111 to their respective normal positions, and also to restore the hand set embodied in the apparatus 600 to its supporting hook or cradle in the event this hand set is being used at the time it is desired to clear out the two established connections. Obviously, when the two connections are no longer desired, the party at the executive substation will release the transfer switch 110 and this switch, being of the non-locking type, will restore to normal. The manner in which the equipment automatically returns to normal when the above operations are performed and the manner in which the two established connections are released will readily be apparent from the preceding description.

It is not possible, with the arrangement formed by combining the apparatus of Fig. 6b with the apparatus shown in Figs. 1 to 5, inclusive, to answer a call incoming to the executive substation or initiate a call to one of the substations not directly accessible to the executive substation at a time when a connection is already established to one of the substations which is directly accessible to the executive substation. Thus, if a connection is established between the executive substation and the substation A, for example, as a result of the operation of the calling switch 100 to the off-normal position corresponding to the line 322 leading to the substation A and the calling party at the executive substation then attempts to initiate a call to one of the other substations, as, for example, the substation B, not directly accessible to the executive substation, by removing the hand set embodied in the apparatus 600 from its supporting cradle or hook, the relay R670 immediately operates to disconnect the line conductors of the cord extending to the apparatus 600 from the line conductors C327 and C328 of the line 323. Also, when the relay R670 operates, it connects the cord line conductors either to the terminals of the repeating transformer winding 501 or the repeating transformer winding 301, depending upon whether the transfer switch 110 occupies its normal or off-normal position. In either case, the disconnection of the line conductors of the cord extending to the apparatus 600 from the conductors of the line 323 precludes the possibility of a call being routed by way of the automatic switching equipment 320 to any one of the lines extending to this equipment.

Under the circumstances outlined above, namely, where the party at the executive substation desires to answer a call routed by way of the line 323 to the apparatus 600 or to initiate a regular call intended for one of the substations associated with a line extending to the automatic switching equipment 320 at a time when a direct call connection is established, it is necessary that the established connection first be released. After the established connection is released, the incoming call may be answered or an outgoing call initiated by using the substation apparatus 600 in the manner outlined previously. Alternatively, the switch springs 668 may be embodied in a manually operable switch which is operable to prepare or complete the operating circuit for R670 independently of the hook or cradle switch. By this modification, it is possible to use the substation apparatus 600 in the usual manner even though it is desired to use the apparatus to answer or initiate a regular call at a time when a direct call connection is established, since so long as the springs 668 are retained in the open circuit position, the operating circuit for R670 cannot be completed.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. In a telephone system, an exchange, a plurality of lines extending to said exchange, a telephone substation, a transmitter and a receiver at said substation, auxiliary receiving means at said substation, automatic switching equipment in said exchange having access to all of said lines, said automatic switching equipment being controllable from said substation or by way of one of said lines to establish a first communication connection between said substation and said one line, automatic switching means in said exchange having access to a group of said lines, said automatic switching means being individual to said substation and being controllable only from said substation to establish a second communication connection between said substation and a second of said lines without releasing said first connection, said transmitter and receiver normally being connected and arranged to be used in communicating over said first connection and said auxiliary receiving means normally being connected and arranged to be used in communicating over said second connection, and means operative to connect said auxiliary receiving means to be used in communicating over said first connection without releasing said second connection.

2. In a telephone system, an exchange, a plurality of lines extending to said exchange, a telephone substation, a transmitter and a receiver at said substation, auxiliary receiving means at said substation, automatic switching equipment in said exchange having access to all of said lines, said automatic switching equipment being controllable from said substation or by way of one of said lines to establish a first communication connection between said substation and said one line, automatic switching means having access to a group of said lines, said automatic switching means being individual to said substation and being controllable only from said substation to establish a second communication connection between said substation and a second of said lines without releasing said first connection, said transmitter and receiver normally being connected and arranged to be used in communicating over said first connection and said auxiliary receiving means normally being connected and arranged to be used in communicating over said second connection, means operative to connect said auxiliary receiving means to be used in communicating over said first connection without releasing said second connection, and means operative to connect said first-named transmitter and receiver to be used in communicating over said second connection without releasing said first connection.

3. In a telephone system, an exchange, a plurality of lines extending to said exchange, a telephone substation, a transmitter and a receiver at said substation, auxiliary receiving means at said substation, automatic switching equipment in said exchange having access to all of said lines, said automatic switching equipment being controllable from said substation or by way of one of said lines to establish a first communication connection between said substation and said one line, automatic switching means having access to a group of said lines, said automatic switching means being individual to said substation and being controllable only from said substation to establish a second communication connection between said substation and a second of said lines, said transmitter and receiver normally being connected and arranged to be used in communicating over said first connection and said auxiliary receiving means normally being connected and arranged to be used in communicating over said second connection, a manually operable switch, and means responsive to the operation of said switch for connecting said receiver to be used in communicating over said second connection without releasing said first connection.

4. In a telephone system, an exchange, a plurality of lines extending to said exchange, a telephone substation, a transmitter and a receiver at said substation, auxiliary receiving means at said substation, automatic switching equipment in said exchange having access to all of said lines, said automatic switching equipment being controllable from said substation or by way of one of said lines to establish a first communication connection between said substation and said one line, automatic switching means having access to a group of said lines, said automatic switching means being individual to said substation and being controllable only from said substation to establish a second communication connection between said substation and a second of said lines, said transmitter and receiver normally being connected and arranged to be used in communicating over said first connection and said auxiliary receiving means normally being connected and arranged to be used in communicating over said second connection, a manually operable switch, means responsive to the operation of said switch for connecting said receiver to be used in communicating over said second connection without releasing said first connection, an input circuit for said auxiliary receiving means, and means responsive to the operation of said switch for rendering said input circuit ineffective to deliver alternating current energy to said auxiliary receiving means.

5. In a telephone system, an exchange, a plurality of lines extending to said exchange, a telephone substation, a transmitter and a receiver at said substation, supporting means for said receiver, auxiliary receiving means at said substation, automatic switching equipment in said exchange having access to all of said lines, said automatic switching equipment being controllable from said substation or by way of one of said lines to establish a first communication connection between said substation and said one line, automatic switching means having access to a group of said lines, said automatic switching means being individual to said substation and being controllable only from said substation to establish a second communication connection between said substation and a second of said lines, said transmitter and receiver normally being connected and arranged to be used in communicating over said first connection and said auxiliary receiving means normally being connected and arranged to be used in communicating over said second connection, and means responsive to the removal of said receiver from said supporting means for connecting said receiver to be used in communicating over said second connection without releasing said first connection.

6. In a telephone system, an exchange, a plurality of lines extending to said exchange, a telephone substation, a transmitter and a receiver at said substation, supporting means for said receiver, auxiliary receiving means at said substation, automatic switching equipment in said exchange having access to all of said lines, said automatic switching equipment being controllable from said substation or by way of one of said lines to establish a first communication connection between said substation and said one line, automatic switching means having access to a group of said lines, said automatic switching means being individual to said substation and being controllable only from said substation to establish a second communication connection between said substation and a second of said lines, said transmitter and receiver normally being connected and arranged to be used in communicating over said first connection and said auxiliary receiving means normally being connected and arranged to be used in communicating over said second connection, a relay operative to connect said receiver to be used in communicating over said second connection without releasing said first connection, an operating circuit for said relay, and means responsive to removal of said receiver from said supporting means for completing said operating circuit.

7. In a telephone system, an exchange, a plurality of lines extending to said exchange, a telephone substation, a transmitter and a receiver at said substation, supporting means for said receiver, auxiliary receiving means at said substation, automatic switching equipment in said exchange having access to all of said lines, said automatic switching equipment being controllable from said substation or by way of one of said lines to establish a first communication connection between said substation and said one line, automatic switching means having access to a group of said lines, said automatic switching means being individual to said substation and being controllable only from said substation to establish a second communication connection between said substation and a second of said lines, said transmitter and receiver normally being connected and arranged to be used in communicating over said first connection and said auxiliary receiving means normally being connected and arranged to be used in communicating over said second connection, a relay operative to connect said receiver to be used in communicating over said second connection without releasing said first connection, an operating circuit for said relay, means responsive to removal of said receiver from said supporting means for completing said operating circuit, an input circuit for said auxiliary receiving means, and means responsive to the operation of said relay for rendering said input circuit ineffective to deliver alternating current energy to said auxiliary receiving means.

8. In a telephone system, an exchange, a plurality of lines extending to said exchange, a telephone substation, a transmitter and a receiver at said substation, supporting means for said receiver, auxiliary receiving means at said substation, automatic switching equipment in said exchange having access to all of said lines, said automatic switching equipment being controllable from said substation or by way of one of said lines to establish a first communication connection between said substation and said one line, automatic switching means having access to a group of said lines, said automatic switching means being individual to said substation and being controllable only from said substation to establish a second communication connection between said substation and a second of said lines, said transmitter and receiver normally being connected and arranged to be used in communicating over said first connection and said auxiliary receiving means normally being connected and arranged to be used in communicating over said second connection, a relay operative to connect said receiver to be used in communicating over said second connection without releasing said first connection, an operating circuit for said relay, means responsive to removal of said receiver from said supporting means for completing said operating circuit, an input circuit for said auxiliary receiving means, and means responsive to the operation of said relay for short-circuiting said input circuit.

9. In a telephone system, an exchange, a plurality of lines extending to said exchange, a telephone substation, a transmitter and a receiver at said substation, supporting means for said receiver, auxiliary receiving means at said substation, automatic switching equipment in said exchange having access to all of said lines, said automatic switching equipment being controllable from said substation or by way of one of said lines to establish a first communication connection between said substation and said one line, automatic switching means having access to a group of said lines, said automatic switching means being individual to said substation and being controllable only from said substation to establish a second communication connection between said substation and a second of said lines, said transmitter and receiver normally being connected and arranged to be used in communicating over said first connection and said auxiliary receiving means normally being connected and arranged to be used in communicating over said second connection, a relay operative to connect said receiver to be used in communicating over said second connection without releasing said first connection, an operating circuit for said relay, means responsive to the removal of said receiver from said supporting means for completing said operating circuit, said operating circuit being so connected and arranged that an undesired transient voltage tends to be developed in response to the completion of said circuit, and means controlled by said relay for substantially preventing said transient voltage from being impressed on either of said communication connections.

10. In a telephone system, an exchange, a plurality of lines extending to said exchange, a telephone substation, a transmitter and a receiver at said substation, supporting means for said receiver, auxiliary receiving means at said substation, automatic switching equipment in said exchange having access to all of said lines, said automatic switching equipment being controllable from said substation or by way of one of said lines to establish a first communication connection between said substation and said one line, automatic switching means having access to a group of said lines, said automatic switching means being individual to said substation and being controllable only from said substation to establish a second communication connection between said substation and a second of said lines, said transmitter and receiver normally being connected and arranged to be used in communicating over said first connection and said auxiliary receiving means normally being connected and arranged to be used in communicating over said second connection, a relay operative to connect said receiver to be used in communicating over said second connection without releasing said first connection, an operating circuit for said relay, means responsive to the removal of said receiver from said supporting means for completing said operating circuit, said operating circuit being so connected and arranged that an undesired transient voltage tends to be developed in response to the completion of said circuit, and means comprising contact springs controlled by said relay for effectively short-circuiting said second communication connection during at least a portion of the period when said transient voltage exists.

11. In a telephone system, an exchange, a plurality of lines extending to said exchange, a telephone substation, a transmitter and a receiver at said substation, supporting means for said receiver, auxiliary receiving means at said substation, automatic switching equipment in said exchange having access to all of said lines, said automatic switching equipment being controllable from said substation or by way of one of said lines to establish a first communication connection between said substation and said one line, automatic switching means having access to a group of said lines, said automatic switching means being individual to said substation and being controllable only from said substation to establish a second communication connection between said substation and a second of said lines without releasing said first connection, said transmitter and receiver normally being connected and arranged to be used in communicating over said first connection and said auxiliary receiving means normally being connected and arranged to be used in communicating over said second connection, a relay operative to connect said receiver to be used in communicating over said second connection without releasing said first connection, an operating circuit for said relay, means responsive to the removal of said receiver from said supporting means for completing said operating circuit, said operating circuit being so connected and arranged that an undesired transient voltage tends to be developed in response to the completion of said circuit, means controlled by said relay for substantially preventing said transient voltage from being impressed on either of said communication connections, an input circuit for said auxiliary receiving means, and means responsive to the operation of said relay for rendering said input circuit ineffective to deliver alternating current energy to said auxiliary receiving means.

12. In a telephone system, an exchange, a plurality of lines extending to said exchange, a telephone substation, a transmitter and a receiver at said substation, supporting means for said receiver, auxiliary receiving means at said substation, automatic switching equipment in said exchange having access to all of said lines, said automatic switching equipment being controllable from said substation or by way of one of said lines to establish a first communication connection between said substation and said one line, automatic switching means having access to a group of said lines, said automatic switching means being individual to said substation and being controllable only from said substation to establish a second communication connection between said substation and a second of said lines without releasing said first connection, said transmitter and receiver normally being connected and arranged to be used in communicating over said first connection and said auxiliary receiving means normally being connected and arranged to be used in communicating over said second connection, a relay operative to connect said receiver to be used in communicating over said second connection without releasing said first connection, an operating circuit for said relay, a second circuit for maintaining said relay energized and for delivering energizing current to said transmitter, means responsive to the removal of said receiver from said supporting means for completing said operating circuit, and means responsive to the resulting operation of said relay for completing said second circuit and for thereafter interrupting said operating circuit.

13. In a telephone system, an exchange, a plurality of lines extending to said exchange, a telephone substation, a transmitter and a receiver at said substation, auxiliary receiving means including a sound reproducing device at said substation and a signal amplifier, automatic switching equipment in said exchange having access to all of said lines, said automatic switching equipment being controllable from said substation or by way of one of said lines to establish a first communication connection between said substation and said one of said lines, said transmitter and receiver normally being connected and arranged to be used in communicating over said first connection, a plurality of calling switches at said substation, said calling switches individually corresponding to the lines of a group of said lines, automatic switching means operative in response to the operation of any one of said calling switches for establishing a second communication connection between said substation and the one of said lines corresponding to said one calling switch, means responsive to the operation of said one calling switch for conditioning said amplifier for operation, said auxiliary receiving means normally being connected and arranged to be used in communicating over said second connection, a manually operable answer switch, and means responsive to the operation of said answer switch for conditioning said amplifier for operation and for connecting said auxiliary receiving means to be used in communicating over said first connection.

14. In a telephone system, an exchange, a plurality of lines extending to said exchange, a telephone substation, a transmitter and a receiver at said substation, auxiliary receiving means including a sound reproducing device at said substation and a signal amplifier, automatic switching equipment in said exchange having access to all of said lines, said automatic switching equipment being controllable from said substation or by way of any one of said lines to establish a first communication connection between said substation and said one of said lines, said transmitter and receiver normally being connected and arranged to be used in communicating over said first connection, a plurality of calling switches at said substation, said calling switches individually corresponding to the lines of a group of said lines, automatic switching means operative in response to the operation of any one of said calling switches for establishing a second communication connection between said substation and the one of said lines corresponding to said one calling switch, means responsive to the operation of said one calling switch for conditioning said amplifier for operation, said auxiliary receiving means normally being connected and arranged to be used in communicating over said second connection, a manually operable answer switch, means responsive to the operation of said answer switch for conditioning said amplifier for operation and for connecting said auxiliary receiving means to be used in communicating over said first connection, a transfer switch, and means responsive to the operation of said transfer switch for reconnecting said auxiliary receiving means to be used in communicating over said second connection.

15. In a telephone system, an exchange, a plurality of lines extending to said exchange, a telephone substation, a transmitter and a receiver at said substation, auxiliary receiving means including a sound reproducing device at said substation and a signal amplifier, automatic switching equipment in said exchange having access to all of said lines, said automatic switching equipment being controllable from said substation or by way of any one of said lines to establish a first communication connection between said substation and said one of said lines, said transmitter and receiver normally being connected and arranged to be used in communicating over said first connection, a plurality of calling switches at said substation, said calling switches individually corresponding to the lines of a group of said lines, automatic switching means operative in response to the operation of any one of said calling switches for establishing a second communication connection between said substation and the one of said lines corresponding to said one calling switch, means responsive to the operation of said one calling switch for conditioning said amplifier for operation, said auxiliary receiving means normally being connected and arranged to be used in communicating over said second established connection, a pair of relays jointly operative to connect said auxiliary receiving means to be used in communicating over said first connection, one of said relays being operative to condition said amplifier for operation, an operating circuit for each of said relays, an answer switch, and means responsive to the operation of said answer switch for completing said operating circuits.

16. In a telephone system, an exchange, a plurality of lines extending to said exchange, a telephone substation, a transmitter and a receiver at said substation, auxiliary receiving means including a sound reproducing device at said substation and a signal amplifier, automatic switching equipment in said exchange having access to all of said lines, said automatic switching equipment being controllable from said substation or by way of any one of said lines to establish a first communication connection between said substation and said one of said lines, said transmitter and receiver normally being connected and arranged to be used in communicating over said first connection, a plurality of calling switches at said substation, said calling switches individually corresponding to the lines of a group of said lines, automatic switching means operative in response to the operation of any one of said calling switches for establishing a second communication connection between said substation and the one of said lines corresponding to said one calling switch, means responsive to the operation of said one calling switch for conditioning said amplifier for operation, said auxiliary receiving means normally being connected and arranged to be used in communicating over said second established connection, a pair of relays jointly operative to connect said auxiliary receiving means to be used in communicating over said first connection, one of said relays being operative to condition said amplifier for operation, an operating circuit for each of said relays, an answer switch, means responsive to the operation of said answer switch for completing said operating circuits, a transfer switch, and means responsive to the operation of said transfer switch for interrupting the operating circuit for the other of said relays without interrupting the operating circuit for said one relay, whereby said auxiliary receiving means is reconnected to be used in communicating over said second connection.

17. In a telephone system, an exchange, a plurality of lines extending to said exchange, a telephone substation, a transmitter and a receiver at said substation, auxiliary receiving means including a sound reproducing device at said substation and a signal amplifier, automatic switching equipment in said exchange having access to all of said lines, said automatic switching equipment being controllable from said substation or by way of any one of said lines to establish a first communication connection between said substation and said one of said lines, said transmitter and receiver normally being connected and arranged to be used in communicating over said first connection, a plurality of calling switches at said substation, said calling switches individually corresponding to the lines of a group of said lines, automatic switching means operative in response to the operation of any one of said calling switches for establishing a second communication connection between said substation and the one of said lines corresponding to said one calling switch, means responsive to the operation of said one calling switch for conditioning said amplifier for operation, said auxiliary receiving means normally being connected and arranged to be used in communicating over said second established connection, a manually operable answer switch, means responsive to the operation of said answer switch for conditioning said amplifier for operation and for connecting said auxiliary receiving means to be used in communicating over said first connection, a second manually operable switch, means responsive to operation of said second switch for connecting said transmitter and receiver to be used in communicating over said second connection.

18. In a telephone system, an exchange, a plurality of lines extending to said exchange, a telephone substation, a transmitter and a receiver at said substation, auxiliary receiving means including a sound reproducing device at said substation and a signal amplifier, automatic switching equipment in said exchange having access to all of said lines, said automatic switching equipment being controllable from said substation or by way of any one of said lines to establish a first communication connection between said substation and said one of said lines, said transmitter and receiver normally being connected and arranged to be used in communicating over said first connection, a plurality of calling switches at said substation, said calling switches individually corresponding to the lines of a group of said lines, automatic switching means operative in response to the operation of any one of said calling switches for establishing a second communication connection between said substation and the one of said lines corresponding to said one calling switch, means responsive to the operation of said one calling switch for conditioning said amplifier for operation, said auxiliary receiving means normally being connected and arranged to be used in communicating over said second established connection, a manually operable answer switch, means responsive to the operation of said answer switch for conditioning said amplifier for operation and for connecting said auxiliary receiving means to be used in communicating over said first connection, a second manually operable switch, means responsive to operation of said second switch for connecting said transmitter and receiver to be used in communicating over said second connection, and means responsive to operation of said second switch for preventing alternating current energy from being delivered through said signal amplifier to said sound reproducing device.

19. In a telephone system, a plurality of lines, a telephone substation, transmitting and receiving means at said substation, automatic switching equipment common to said lines, said automatic switching equipment being controllable by way of any one of said lines to establish a first communication connection between said substation and said one of said lines, said first connection including a normally incomplete branch extending to said transmitting and receiving means, a plurality of calling switches at said substation, said calling switches individually corresponding to said lines, automatic switching means operative in response to the operation of any one of said calling switches to establish a second communication connection between said substation and the one of said lines corresponding to said one calling switch, said second communication connection including a normally complete line section extending to said transmitting and receiving means, said line section being adapted to be interrupted without releasing said second connection, and means operative to interrupt said line section and to complete said branch, thereby to disconnect said transmitting and receiving means from said second connection and to connect said transmitting and receiving means to be used in communicating over said first connection.

20. In a telephone system, an exchange, a plurality of lines extending to said exchange, a telephone substation, transmitting and receiving means at said substation, auxiliary transmitting and receiving means at said substation, automatic switching equipment in said exchange having access to all of said lines, said automatic switching equipment being controllable from said substation or by way of one of said lines to establish a first communication connection between said substation and said one of said lines, said first connection extending to said first-named transmitting and receiving means and including a normally incomplete branch extending to said auxiliary transmitting and receiving means, a plurality of calling switches at said substation, said calling switches individually corresponding to the lines of a group of said lines, automatic switching means operative in response to the operation of any one of said calling switches to establish a second communication connection between said substation and the one of said lines corresponding to said one calling switch, said second communication connection including a normally complete line section extending to said auxiliary transmitting and receiving means, said line section being adapted to be interrupted without releasing said second connection, means operative to interrupt said line section and to complete said branch, thereby to disconnect said auxiliary transmitting and receiving means from said second connection and to connect said auxiliary transmitting and receiving means to be used in communicating over said first connection, and means for disconnecting said first-named transmitting and receiving means from said first connection and for connecting said first-named transmitting and receiving means to be used in communicating over said second connection.

21. In a telephone system, an exchange, a plurality of lines extending to said exchange, a telephone substation, transmitting and receiving means at said substation, auxiliary transmitting means at said substation, auxiliary receiving means including a sound reproducing device at said substation and a signal amplifier, automatic switching equipment in said exchange having access to all of said lines, said automatic switching equipment being controllable from said substation or by way of one of said lines to establish a first communication connection between said substation and said one of said lines, said first connection extending to said first-named transmitting and receiving means and including a normally incomplete branch extending to said auxiliary transmitting and receiving means, a plurality of calling switches at said substation, said calling switches individually corresponding to the lines of a group of said lines, automatic switching means operative in response to the operation of any one of said calling switches to establish a second communication connection between said substation and the one of said lines corresponding to said one calling switch, said second communication connection including a normally complete line section extending to said auxiliary transmitting and receiving means, said line section being adapted to be interrupted without releasing said second connection, a first relay operative to condition said amplifier for operation, a second relay operative to interrupt said line section, said relays being jointly operative to complete said branch, thereby to disconnect said auxiliary transmitting and receiving means from said second connection and to connect said auxiliary transmitting and receiving means to be used in communicating over said first connection, an operating circuit for each of said relays, an answer switch, and means responsive to operation of said answer switch for completing said operating circuits.

22. In a telephone system, an exchange, a plurality of lines extending to said exchange, a telephone substation, transmitting and receiving means at said substation, auxiliary transmitting means at said substation, auxiliary receiving means including a sound reproducing device at said substation and a signal amplifier, automatic switching equipment in said exchange having access to all of said lines, said automatic switching equipment being controllable from said substation or by way of one of said lines to establish a first communication connection between said substation and said one of said lines, said first connection extending to said first-named transmitting and receiving means and including a normally incomplete branch extending to said auxiliary transmitting and receiving means, a plurality of calling switches at said substation, said calling switches individually corresponding to the lines of a group of said lines, automatic switching means operative in response to the operation of any one of said calling switches to establish a second communication connection between said substation and the one of said lines corresponding to said one calling switch, said second communication connection including a normally complete line section extending to said auxiliary transmitting and receiving means, said line section being adapted to be interrupted without releasing said second connection, a first relay operative to condition said amplifier for operation, a second relay operative to interrupt said line section, said relays being jointly operative to complete said branch, thereby to disconnect said auxiliary transmitting and receiving means from said second connection and to connect said auxiliary transmitting and receiving means to be used in communicating over said first connection, an operating circuit for each of said relays, an answer switch, means responsive to operation of said answer switch for completing said operating circuits, a transfer switch, and means responsive to operation of said transfer switch for interrupting the operating circuit for said second relay without interrupting the operating circuit for said first relay, whereby said auxiliary transmitting and receiving means is disconnected from said first connection and is reconnected to be used in communicating over said second connection.

23. In a telephone system, a telephone line, a first substation adapted to be connected to said line, a second substation including transmitting and receiving means, means including automatic switching means controllable from said second substation for establishing a communication connection including said line between said substations, said established communication connection being only locally interrupted at said first substation in response to a release operation performed at said first substation, whereby said connection is susceptible of being reestablished in response to an operation performed at said first substation, and means responsive to said release operation for rendering said connection ineffective to transmit signal frequency currents from said second substation to said first substation.

24. In a telephone system, a telephone line, a first substation adapted to be connected to said line, a second substation including transmitting and receiving means, means including automatic switching means controllable from said second substation for establishing a communication connection including said line between said substations, means operative to supply energizing current to said transmitting means when said connection is established, said established communication connection being only locally interrupted at said first substation in response to a release operation performed at said first substation, whereby said connection is susceptible of being reestablished in response to an operation performed at said first substation, and means responsive to said release operation for preventing energizing current from again being supplied to said transmitting means until the established connection is released and a second connection is established.

25. In a telephone system, a telephone line, a first substation adapted to be connected to said line, a second substation including transmitting and receiving means, means including automatic switching means controllable from said second substation for establishing a communication connection including said line between said substations, a normally incomplete circuit for supplying energizing current to said transmitting means, a relay operative from one of its two positions to the other to complete said circuit in Search Room response to the completion of said connection, said established communication connection being only locally interrupted at said first substation in response to a release operation performed at said first substation, whereby said connection is susceptible of being reestablished in response to a second operation performed at said first substation, said relay being operative from its said other position to its said one position in response to said release operation and from said one position to said other position in response to said second operation, and means responsive to the operation of said relay from its other position to its one position for interrupting said circuit and for holding said circuit interrupted independently of the position of said relay.

26. In a telephone system, a plurality of lines, a telephone substation comprising transmitting means, receiving means and an anti-side-tone impedance network interconnected to form a substation circuit, automatic switching equipment common to said lines, said automatic switching equipment being controllable by way of one of said lines to establish a first communication between said substation and said one line, automatic switching means having access to said lines, said automatic switching means being individual to said substation and being controllable only from said substation to establish a second communication connection between said substation and a second of said lines without releasing said first connection, means for selectively connecting said transmitting and receiving means to be used in communicating over either of said first or second connections, a pair of line balancing circuits included in said impedance network, and means controlled by said last-named means for selectively connecting said balancing circuits to be operatively included in said network.

27. A telephone substation adapted to be connected to a line for communication thereover and comprising, in combination, a transmitter and a receiver, supporting means for said receiver, auxiliary receiving means normally connected and arranged to be used in communicating over said line, a relay operative to connect said receiver to be used in communicating over said line, an operating circuit for said relay, a second circuit for maintaining said relay energized and for delivering energizing current to said transmitter, means responsive to the removal of said receiver from said supporting means for completing said operating circuit, and means responsive to the resulting operation of said relay for completing said second circuit and for thereafter interrupting said operating circuit.

28. A telephone substation adapted to be connected to a line for communication thereover and comprising, in combination, a transmitter and a receiver, supporting means for said receiver, auxiliary receiving means normally connected and arranged to be used in communicating over said line, a relay operative to connect said receiver to be used in communicating over said line, an operating circuit for said relay, means responsive to the removal of said receiver from said supporting means for completing said operating circuit, said operating circuit being so connected and arranged that an undesired transient voltage tends to be developed in response to the completion of said operating circuit, and means controlled by said relay for substantially preventing said transient voltage from being impressed on said line.

29. A telephone substation adapted to be connected to a line for communication thereover and comprising, in combination, a transmitter and a receiver, supporting means for said receiver, auxiliary receiving means normally connected and arranged to be used in communicating over said line, a relay operative to connect said receiver to be used in communicating over said line, means responsive to removal of said receiver from said supporting means for causing the operation of said relay, an input circuit for said auxiliary receiving means, and means responsive to the operation of said relay for rendering said input circuit ineffective to deliver alternating current energy to said auxiliary receiving means.

30. In a telephone system, a plurality of lines, a telephone substation including transmitting and receiving means, automatic switching equipment common to said lines, said automatic switching equipment being controllable by way of any one of said lines to establish a first communication connection between said substation and said one line, additional automatic switching means, said additional automatic switching means being independent of said automatic switching equipment and having access to said lines, manually operable switches at said substation, said switches individually corresponding to said lines, means responsive to operation of one of said switches for causing said additional automatic switching means to establish a second communication connection between said substation and the line corresponding to said one switch, and means for selectively connecting said transmitting and receiving means to be used in communication over either of said established connections.

31. In a telephone system, a plurality of lines, a telephone substation including transmitting and receiving means, automatic switching equipment common to said lines, said automatic switching equipment being controllable by way of any one of said lines to establish a first communication connection between said substation and said one line, additional automatic switching means, said additional automatic switching means being independent of said automatic switching equipment and having access to said lines, manually operable switches at said substation, said switches individually corresponding to said lines, means responsive to operation of one of said switches for causing said additional automatic switching means to establish a second communication connection between said substation and the line corresponding to said one switch, said transmitting and receiving means normally being connected and arranged to be used in communicating over said second connection, an additional switch operable between two positions, and means responsive to operation of said additional switch from one of its two positions to the other for disconnecting said transmitting and receiving means from said second connection and for connecting said transmitting and receiving means to be used in communicating over said first connection.

32. In a telephone system, a plurality of lines, a telephone substation including transmitting and receiving means, automatic switching equipment common to said lines, said automatic switching equipment being controllable by way of any one of said lines to establish a first communication connection between said substation and said one line, additional automatic switching means, said additional automatic switching means being independent of said automatic switching equipment and having access to said lines, manually operable switches at said substation, said switches individually corresponding to said lines, means responsive to operation of one of said switches for causing said additional automatic switching means to establish a second communication connection between said substation and the line corresponding to said one switch, said transmitting and receiving means normally being connected and arranged to be used in communicating over said second connection, answer and transfer switches each operable between two positions, means responsive to operation of said answer switch from one of its two positions to the other for disconnecting said transmitting and receiving means from said second connection and for connecting said transmitting and receiving means to be used in communicating over said first connection, and means responsive to operation of said transfer switch from one of its two positions to the other for disconnecting said transmitting and receiving means from said first connection and for again connecting said transmitting and receiving means to be used in communicating over said second connection.

33. In a telephone system, a plurality of lines, a telephone substation including transmitting and receiving means, automatic switching equipment common to said lines, said automatic switching equipment being controllable by way of any one of said lines to establish a first communication connection between said substation and said one line, additional automatic switching means, said additional automatic switching means being independent of said automatic switching equipment and having access to said lines, manually operable switches at said substation, said switches individually corresponding to said lines, means responsive to operation of one of said switches for causing said additional automatic switching means to establish a second communication connection between said substation and the line corresponding to said one switch, said transmitting and receiving means normally being connected and arranged to be used in communicating over said second connection, a relay operative to disconnect said transmitting and receiving means from said second connection and to connect said transmitting and receiving means to be used in communicating over said first connection, answer and transfer switches each operable between two positions, an operating circuit for said relay, means responsive to operation of said answer switch from one of its two positions to the other for completing said operating circuit, and means responsive to the operation of said transfer switch from one of its two positions to the other for interrupting said operating circuit.

34. In a telephone system, a plurality of lines, a telephone substation, a transmitter and a receiver at said substation, auxiliary receiving means at said substation, automatic switching equipment for setting up connections between said lines, said automatic switching equipment being controllable from said substation or by way of one of said lines to establish a first communication connection between said substation and said one line, automatic switching means having access to a group of said lines, said automatic switching means being individual to said substation and being controllable only from said substation to establish a second communication between said substation and a second of said lines without releasing said first connection, said transmitter and receiver normally being connected and arranged to be used in communicating over said first connection and said auxiliary receiving means normally being connected and arranged to be used in communicating over said second connection, and means operative to connect said auxiliary receiving means to be used in communicating over said first connection without releasing said second connection.

35. In a telephone system, a telephone substation adapted to be connected to either of two lines for communication thereover and comprising, in combination, a transmitter and receiver normally adapted to be used in communicating over one of said lines, auxiliary receiving means normally adapted to be used in communicating over the other of said lines, switching means for connecting said auxiliary receiving means for use in communicating over said one line, a relay partially controlled by said switching means for connecting said transmitter and receiver for use in communicating over said other line, and an alternative channel jointly controlled by said switching means and said relay for connecting said transmitter and receiver for use in communicating over said one line.

36. In a telephone system, a telephone substation adapted to be connected to either of two lines for communication thereover and comprising, in combination, a transmitter and receiver normally adapted to be used in communicating over one of said lines, a supporting element for said receiver, auxiliary receiving means normally adapted to be used in communicating over the other of said lines, switching means for connecting said auxiliary receiving means for use in communicating over said one line, a relay partially controlled by said switching means and operative in response to removal of said receiver from said supporting element for connecting said transmitter and receiver for use in communicating over said other line, and an alternative channel jointly controlled by said switching means and said relay for connecting said transmitter and receiver for use in communicating over said one line.

37. In a combined telephone and loud-speaking intercommunicating system, a master station, a subordinate station having a telephone handset, a distant talking transmitter at said master station, a source of current, means at said master station for preparing a supply circuit from said source of current to said distant talking transmitter, and means controlled by the receiver of the telephone handset at said subordinate station for completing the supply circuit to said transmitter.

38. In a combined telephone and loud-speaking intercommunicating system, a pair of stations, an intercommunicating line, means including said line for establishing a communication connection between said stations, said established connection being only partially interrupted in response to a release operation performed at one of said stations, whereby said connection is susceptible of being reestablished in response to an additional operation performed at said one station, and means responsive to said release operation for rendering the apparatus involved in said connection ineffective to transmit voice signals from the other of said stations to said one station even though said additional operation is performed at said one station.

39. In a combined telephone and loud-speaking intercommunicating system, a first station including a transmitter, a second station, an intercommunicating line, means including said line for establishing a communicating connection between said stations, means operative to supply energizing current to said transmitter when said connection is established, said established connection being only partially interrupted in response to a release operation performed at said second station, whereby said connection is susceptible of being re-established in response to an additional operation performed at said second station, and means responsive to said release operation for preventing energizing current from again being supplied to said transmitter until the established connection is released and a second connection is established.

40. In a combined telephone and loud-speaking intercommunicating system, a master station, a subordinate station, an intercommunicating line, means including said line for establishing a communication connection between said stations, said established connection being only partially interrupted in response to a release operation performed at said subordinate station, whereby said connection is susceptible of being reestablished in response to an additional operation performed at said subordinate station, and means responsive to said release operation for rendering the apparatus involved in said connection ineffective to transmit voice signals from said master station to said subordinate station even though said additional operation is performed at said subordinate station.

41. In a combined telephone and loud-speaking intercommunication system, a master station, a subordinate station, means for establishing a two-way communication connection between said stations, and means operative in response to a release operation performed at said subordinate station for converting said connection into a one-way communication connection such that voice signals can only be transmitted from said subordinate station to said master station.

42. In a telephone system, a pair of stations, means for establishing a two-way communication connection between said stations, switching means provided at one of said stations, and means associated with the other of said stations and controllable over said connection by said switching means for converting said connection into a one-way communication connection.

43. In a telephone system, a pair of stations, means for establishing a two-way communication connection between said stations, and means controllable over said connection from one of said stations for preventing voice signal currents from being transmitted over said connection from the other of said stations to said one station so long as said connection is established.

44. In a telephone system, a pair of stations, means for establishing a communication connection between said stations, said connection comprising channels for transmitting signal currents between said stations in the respective two directions of transmission, and means controllable over said connection from one of said stations for rendering only one of said channels ineffective to transmit signal currents so long as said connection is established.

ROSWELL HARRY HERRICK.